United States Patent [19]

Bolton

[11] 4,343,037
[45] Aug. 3, 1982

[54] VISUAL DISPLAY SYSTEMS OF THE COMPUTER GENERATED IMAGE TYPE

[75] Inventor: Martin J. P. Bolton, Crawley, England

[73] Assignee: Redifon Simulation Limited, Sussex, England

[21] Appl. No.: 159,442

[22] Filed: Jun. 13, 1980

[30] Foreign Application Priority Data

Jun. 15, 1979 [GB] United Kingdom ............... 7920882
Jun. 9, 1980 [GB] United Kingdom ............... 8018838

[51] Int. Cl.³ .............................................. G09B 9/08
[52] U.S. Cl. .................................... 364/521; 358/104; 434/43
[58] Field of Search ............... 369/515, 521; 358/104; 434/43

[56] References Cited

U.S. PATENT DOCUMENTS 3,996,672 12/1976 Osofsky et al. ........................ 434/43
3,999,308 12/1976 Peters ..................................... 434/43
4,179,823 12/1979 Sullivan et al. ................... 364/521 X
4,263,726 4/1981 Bolton ................................... 434/43

Primary Examiner—Felix D. Gruber
Attorney, Agent, or Firm—Larson and Taylor

[57] ABSTRACT

A visual display system of the computer generated image type, for a ground based flight-simulator having a rectangular raster-scanned display and having a surface detail information store for providing a visual display of textured surfaces in perspective during simulated flight. The system includes a surface detail generator comprising a perspective transformation computer and a surface detail store. The perspective transformation computer is organized as a pipeline processor to computete in real time the perspective transformation from the textured surface (ground) plane to the display plane. Scanning of the surface detail store is controlled in a manner comparable with a trapezium scan of a photographic image, for the purpose of the perspective transformation.

6 Claims, 42 Drawing Figures

VISUAL DISPLAY SYSTEMS OF THE COMPUTER GENERATED IMAGE TYPE

INTRODUCTION TO THE DESCRIPTION

This invention relates to real-time computer-generated image displays of three-dimensional scenes for ground-based flight simulation and is particularly concerned with the provision of textured surfaces.

Ground-based flight simulators are increasingly used for flight training. The simulator provides a dummy cockpit with dummy controls and a flight computer which computes in real time the characteristics of real flight during an exercise. Forward of the dummy cockpit there is frequently provided a visual display of terrain overflown during the exercise. The present invention relates to such visual displays.

Electronically produced visual displays conventionally employ one or more cathode ray tubes or a television type projector which projects the display upon a forward projection screen which is viewed by the trainee pilot through the cockpit forward windows.

The method of image production may then be either calligraphic or raster scan.

Although an earlier method of image generation used a closed-circuit television camera moving over a scale model of terrain, the majority of ground-based flight simulators now manufactured use digital computer generated images (C.G.I.).

As stated, the display method may be either calligraphic or raster-scan. The calligraphic method lends itself particularly to the display of night scenes, which consist almost solely of a display of light points on the simulated ground plane.

A typical night-only C.G.I. generator comprises a database holding digital data models of selected airports, stored on one or more floppy discs for example, a minicomputer for preliminary model processing and in the memory of which the currently-used airport model is held, a special-purpose transformation processor and a beam-penetration type display tube. Such a typical system is able to display a ground scene containing 6,000 light point and, in addition, construct surface involving up to 64 edges. Such a scene is, of course, computed and displayed in true perspective in real time during a flight exercise.

A limitation of calligraphic image display is that the time required to paint one frame of the image is a function of the complexity of the scene. Human eye sensitivity to image flicker demands a frame repetition rate of about 30 Hz. and this sets a practical limitation upon the scene complexity at present possible for a real-time display.

A high-complexity daylight scene, involving for example the display not only of runway features, but also solid surfaces of surrounding terrain features and airport and neighbouring city buildings, demands a raster scan type display.

The first-known real-time C.G.I. image system depicting solid surfaces was able to provide a scene based on up to 240 edges. An "edge", that is a line dividing two distinguishable surfaces, defined the visual environment for such a display. The edges were transformed into the display plane and incrementally generated by hardware edge generators. In the presentation of a three-dimensional scene in true perspective, hidden surfaces were eliminated by programming priorities among the edge generators.

Subsequent C.G.I. systems provided higher complexity scenes, including the display of curved surfaces. These systems use the "polygon" to define the visual environment and can generate scenes involving a few hundred polygons. Such systems at present in development are likely to provide scenes of one order greater scene complexity, that is involving some few thousand polygons.

However, scenes defined solely by edges or polygons may never be adequately realistic for flight training purposes. Although the scenes provided by available C.G.I. systems have proved valuable for training airline pilots particularly in take-off or landing manoeuvres, they are inadequate for many military operations.

The known techniques are unable to provide, economically and in real time, realistically-textured surfaces in correct and changing perspective.

The object of the present invention is to provide a C.G.I. system capable of displaying textured plane surfaces.

Accordingly, the invention provides a visual display system of the computer generated image type, for a ground-based flight simulator, providing a rectangular raster scanned, perspective-transformed, pilot's visual display of a simulated textured surface, including a surface detail generator comprising a perspective transformation computer and a surface texture detail store, the perspective transformation computer being a pipeline calculator for computing in real time the perspective transformation from the simulated surface plane to the display system display plane continuously during simulated flight, and correspondingly scanning the surface texture detail store to provide texture for each element of the said rectangular raster scanned pilot's visual display.

SHORT DESCRIPTION OF THE DRAWINGS

In order that the invention may readily be carried into practice, relevant prior art will be referred to and one embodiment of the invention will be described in detail by way of example, both with reference to the accompanying drawings, of which:

FIGS. 1–8 relate to prior art and FIGS. 9–41 relate to the present invention;

and in which.

Figure 29:
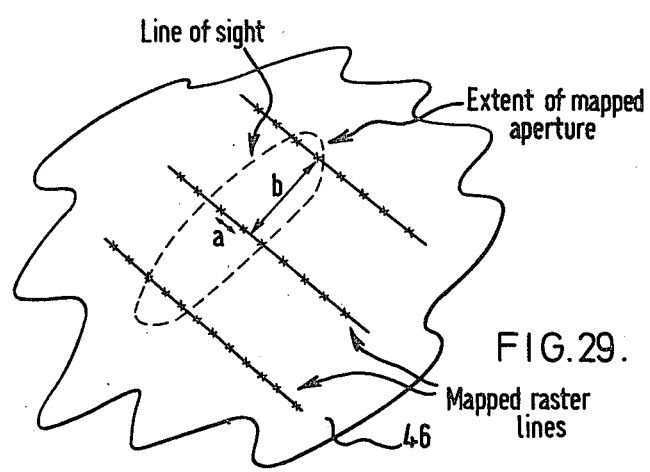
Figure 30:
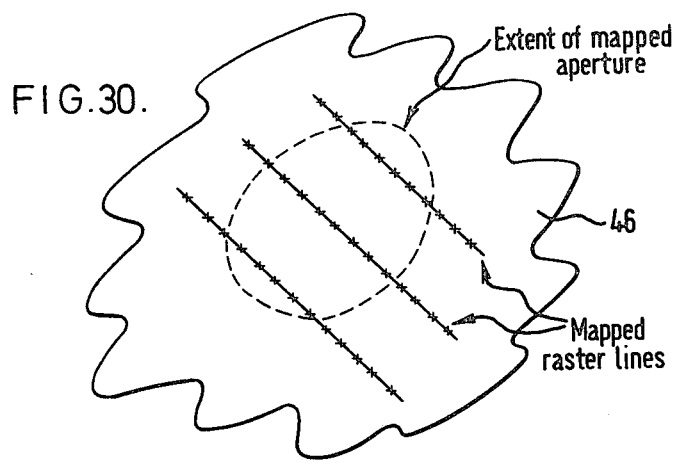
Figure 31:
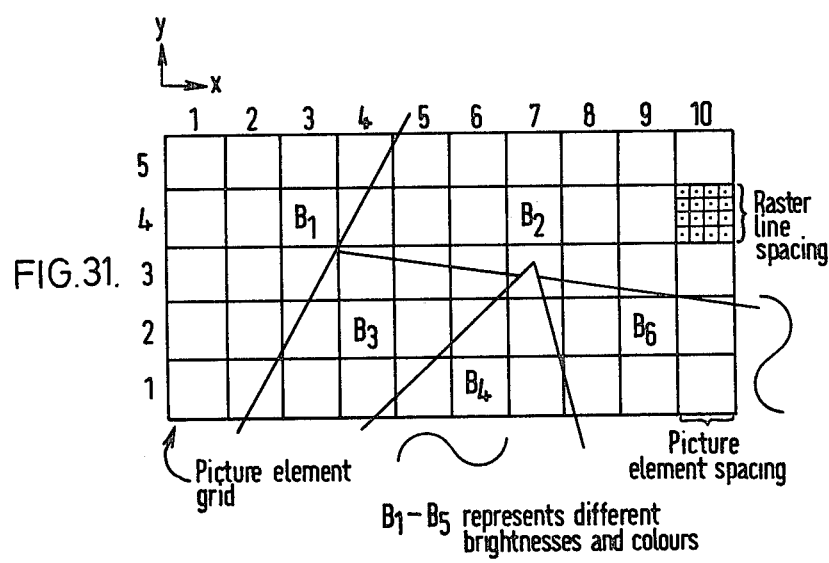
Figure 32:
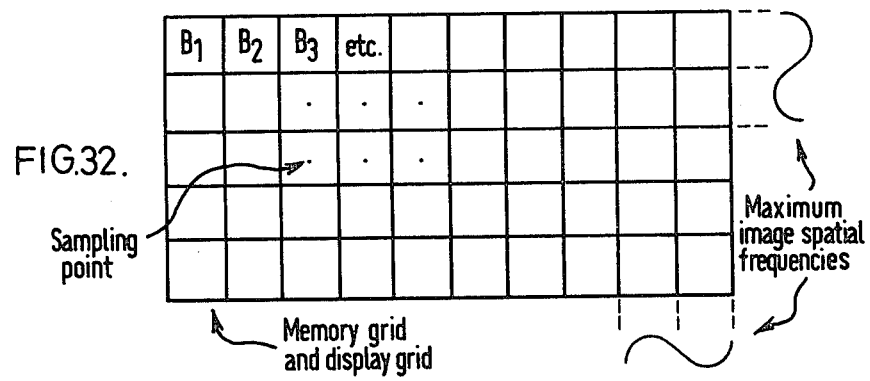
Figure 33:
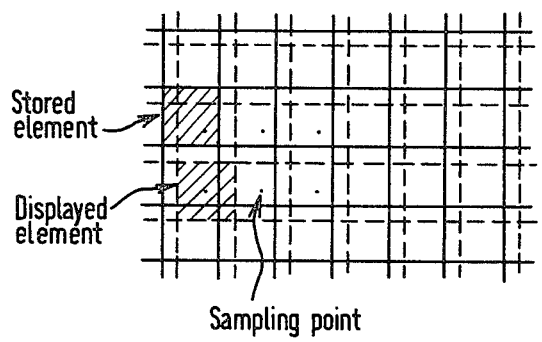
Figure 34:
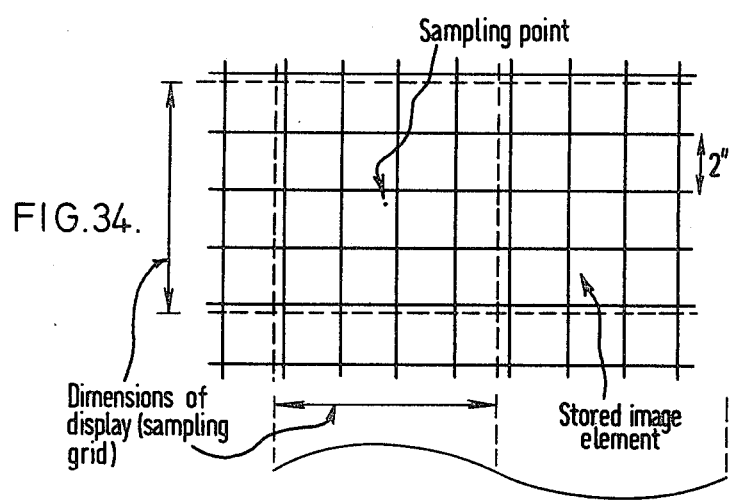
Figure 35:
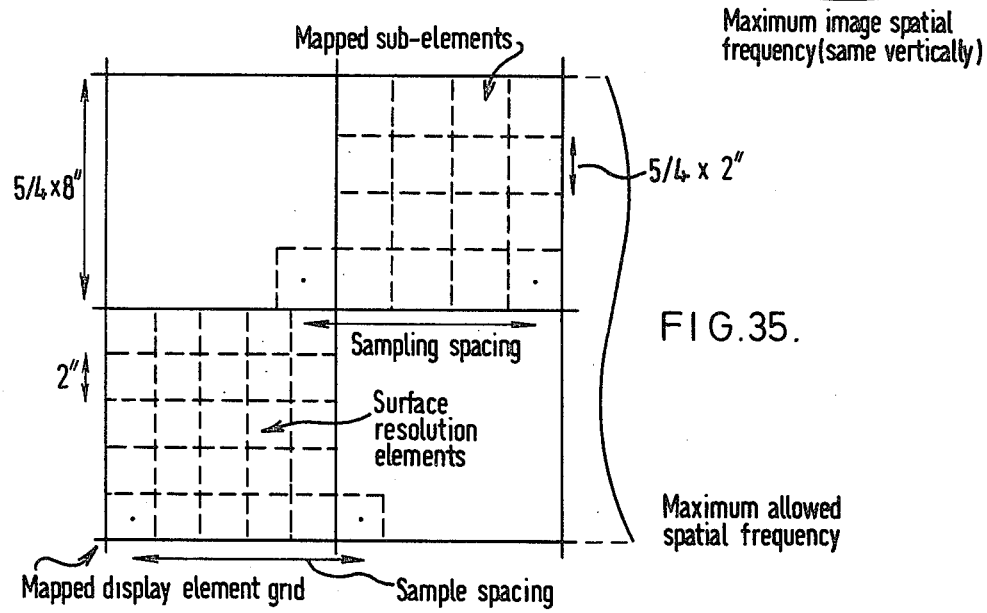
Figure 36:
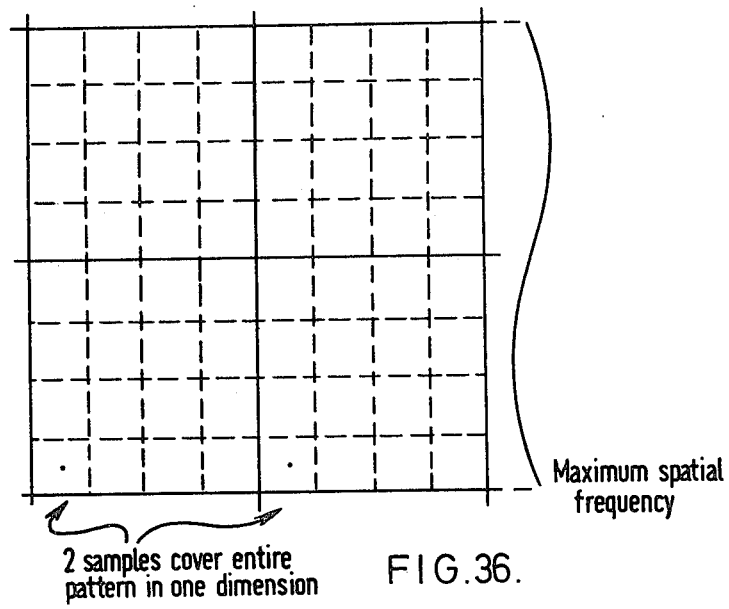
Figure 37:
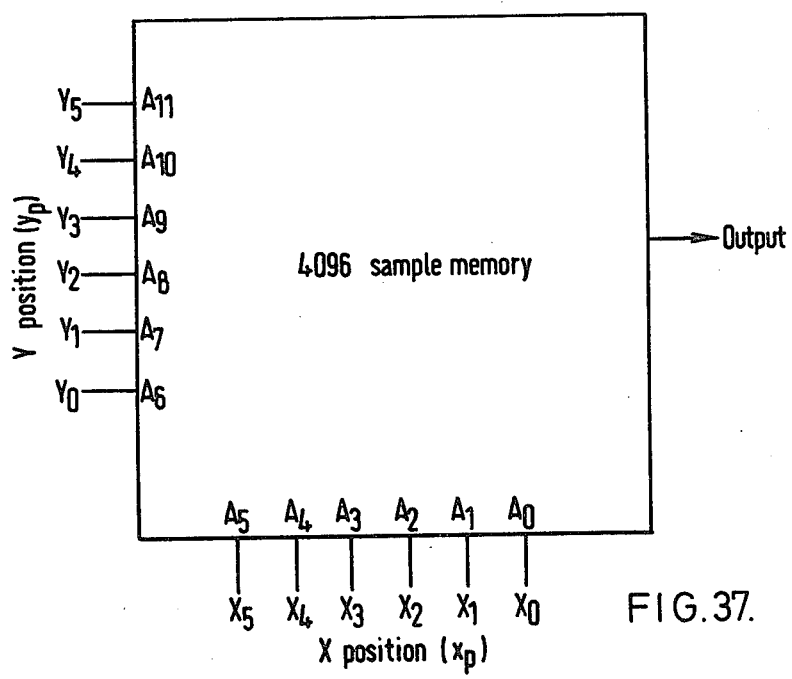
Figure 38:
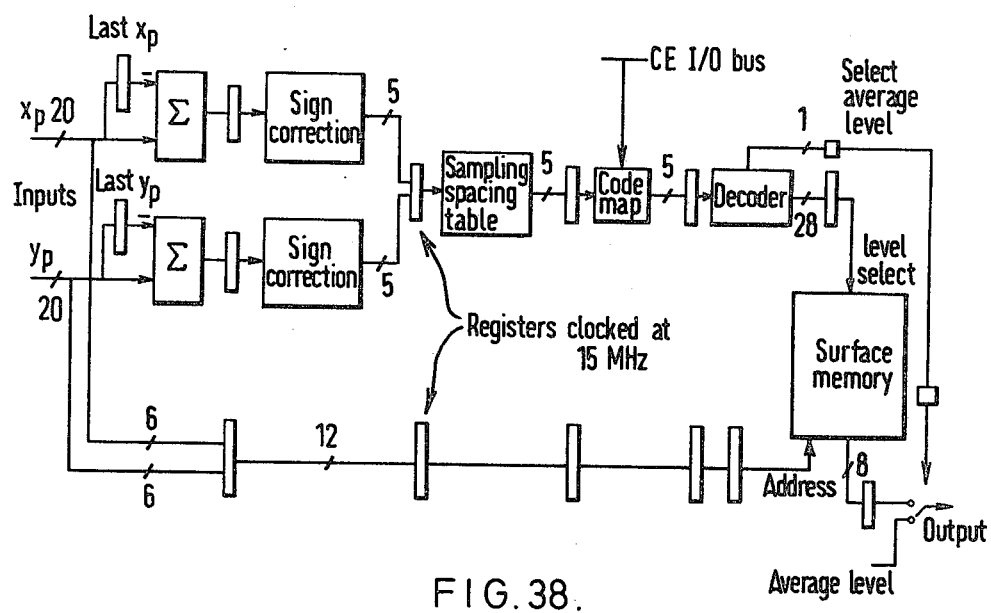
Figure 39:
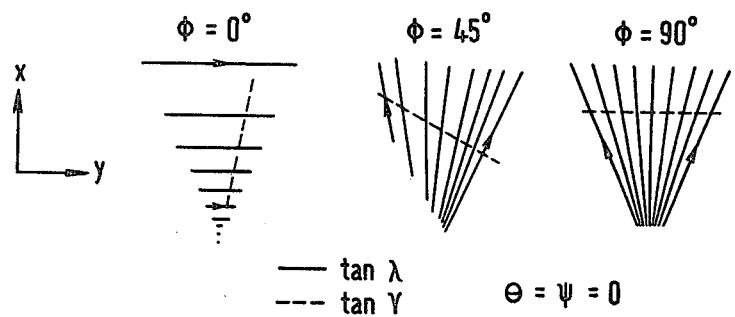
Figure 40:
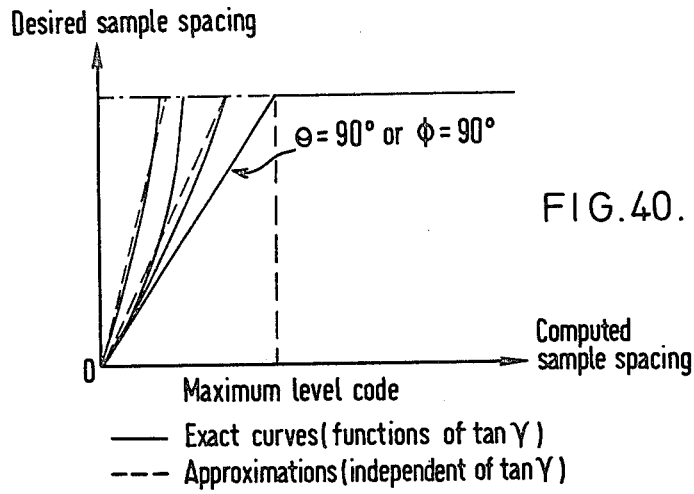
Figure 41:
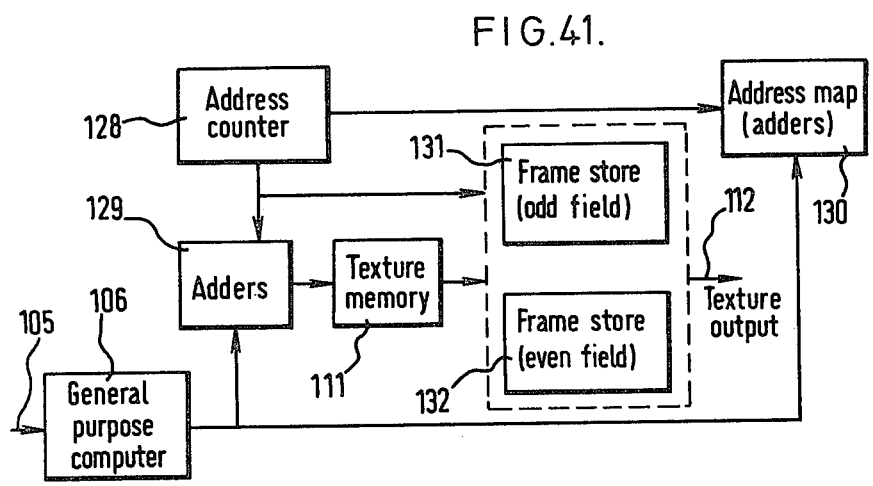
Figure 42:
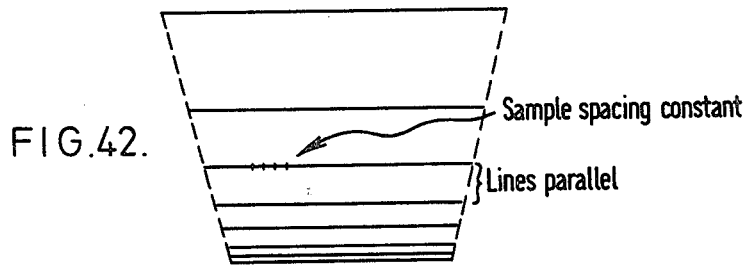

FIG. 29 explains the filter effect of a mapped aperture in an accurate simulation; and FIG. 30 explains the modified filter effect of an approximated aperture;

FIG. 31 shows the relationships between the picture element grid, scene edges and the quantisation grid of a display;

FIG. 32 illustrates the process of sampling with matching grids, showing the relationship between the sampling interval and the maximum image spatial frequencies;

FIG. 33 corresponds to the diagram of FIG. 32 but shows a displaced sampling grid;

FIG. 34 shows the use of a fine image memory grid;

FIG. 35 is a diagram of surface resolution elements showing a sample spacing of five elements;

FIG. 36 is the corresponding diagram wherein two samples define the entire pattern in one of its dimensions;

FIG. 37 shows the addressing of level zero, which contains 4096 samples;

FIG. 38 is a block diagram showing the complete memory system;

FIG. 39 shows mapped raster lines for three different angles of aircraft roll with zero pitch and heading angles;

FIG. 40 shows approximated level code mapping;

FIG. 41 is a block schematic diagram of a surface detail generator using the rolled-raster principle and providing separate stores for the odd and the even fields; and FIG. 42 is a diagram showing the form of the mapped raster with constant sample spacing along raster lines.

DESCRIPTION OF THE PRIOR ART

For the correct representation of texture in a surface of a computed perspective image, that texture must be defined as a part of the geometrical database which defines the visual environment. It is then possible to subject the texture to the same transformations as are applied to the points, lines and polygons of the scene. This process ensures that textures are firmly attached to their respective surfaces and exhibit the same perspective variations both static and dynamic.

In contrast, methods have been proposed for applying texture to the transformed image, that is display plane texturing.

Display plane texturing can be used for certain effects. Thus, scintillation of sunlight from water surfaces can be simulated simply by injecting random pulses in areas of the scene representing water. Another application is for the simulation of water droplets on sights or windshields fixed relatively to the observer, and therefore not subject to perspective change.

An approximation to correct texture perspective has been proposed, in which the proximity of texture elements is increased in the direction towards the displayed horizon. While some realism is added to the overall scene, this expedient is inadequate for manoeuvres where depth and slant range perception are important.

An always present limitation of display plane texturing is that the textures are not attached to their respective surfaces so that, with a changing scene, the effect is analagous to viewing the world through a patterned net curtain.

Texturing may alternatively be added to a C.G.I. display by defining the texture in terms of edges, similarly to other features of the scene. For a real-time system, however, this method is impracticable because of the large number of edges needed.

Display plane texturing is not effective or not economical except for limited effects and some alternative method must be used.

One such is the raster shaping principle of the present invention, as described herein.

This principle may be described as follows, in terms of a television system:

If the camera and display tube scanning rasters differ, the displayed image is distorted.

If the camera raster is shaped and the display tube raster has the normal format, the displayed image undergoes a transformation which is the inverse of that applied to the camera raster.

Figure 1:
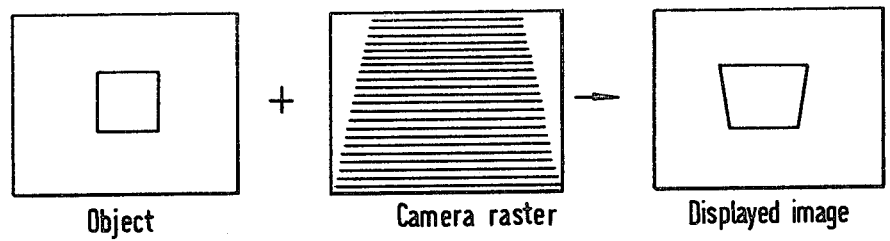
FIG. 1 is a diagram showing the effect of differently shaped camera and display rasters.

FIG. 1 shows the effect of such raster shaping. The left diagram represents the viewed scene comprising a square object on a rectangular field. The centre diagram shows trapezium shaping of the camera raster and the right diagram shows the inversely transformed displayed object.

The effect extends further to two-dimensional distortion and even to curvi-linear distortion.

A particular case is inverse perspective distortion. If an inverse perspective transformation is applied to shape the camera raster, then the object is displayed in perspective.

Figure 2:
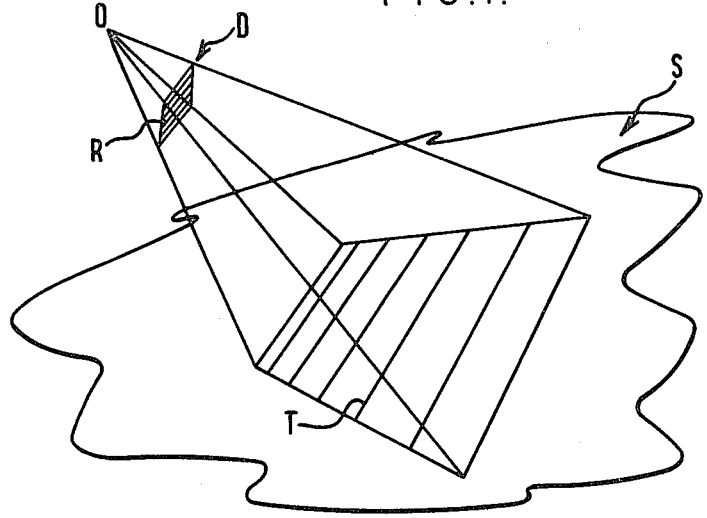
FIG. 2 is a diagram illustrating the mapping of a display raster onto a different plane.

FIG. 2 explains the principle of such inverse perspective distortion. An observer at O views the plane S. In front of the observer is erected a display plane D, defined by a scanning raster R. In a simulation, an image in the plane D is required to be identical to the observer's view of the real-world plane S.

Considering the projection of the display raster R upon the plane S, as shown at T, the raster T distorted by projection represents the required inverse perspective distortion. Surface details on the plane S, explored by the distorted raster R, would be displayed in the plane D in correct perspective.

This same principle is applied by the invention to synthetic image generation from stored image data representing the plane S, by using scanned sampling which is subject to inverse perspective distortion.

The implementation of this method involves the real-time calculation of the inverse perspective transformation continuously as the position and attitude of the observer and his display plane change with respect to the simulated plane viewed.

Figure 3:
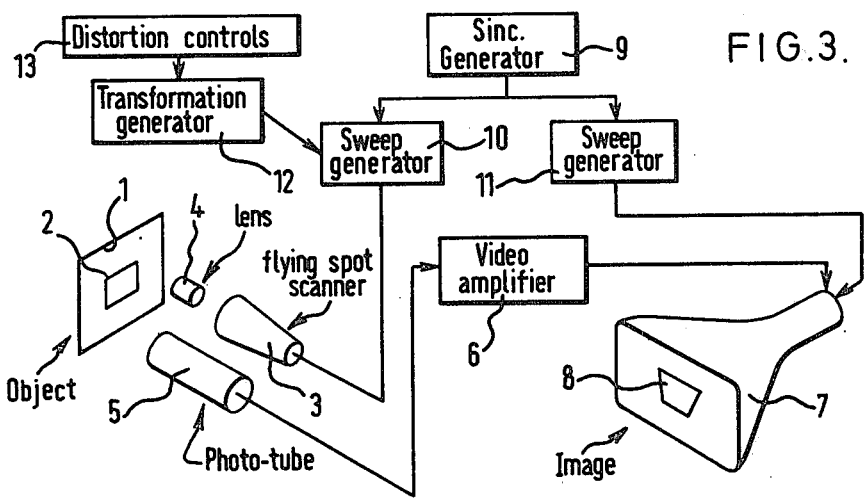
FIG. 3 is a perspective and block schematic diagram showing apparatus for raster shaping with a photographic image.

FIG. 3 is a diagram, part perspective and part block schematic, showing a known application of the raster shaping method in a closed circuit television system.

In FIG. 3, an object plane 1 carries a rectangular FIG. 2, which is scanned by a flying spot scanner 3 by way of an associated lens system 4. The video signal is provided by a phototube 5, amplified by a video amplifier 6 and fed to a cathode ray display tube 7 to provide an image 8. A single synchronising pulse generator 9 serves both the flying spot scanner sweep generator 10 and the CRT sweep generator 11. The raster scan of the CRT 7 is a normal rectilinear scan. The raster scan of the flying spot scanner is a trapezium narrower at the top than at the bottom, as shown in FIG. 1. The shape of the raster scan of the plane 1 is determined by a transformation generator 12 under control from distortion controls 13.

Because the flying spot scan is a trapezium narrower at the top than at the bottom and because the raster scan of CR tube 7 is rectilinear, the rectangle 2 is transformed into a trapezium 8, which is the inverse of the flying spot scan and thus is wider at the top than at the bottom.

If the object plane 1 is a terrain view photograph or transparency, the CRT image 8 shows a perspective transformation which, if the distortion controls 13 are set as required, can effect the perspective transformation of FIG. 2, where the plane 1 corresponds to the plane S and the image 8 is provided in the plane D.

Photographic image scanning in the manner of FIG. 3 was subject to a serious problem, that of improper sampling.

Figure 4:
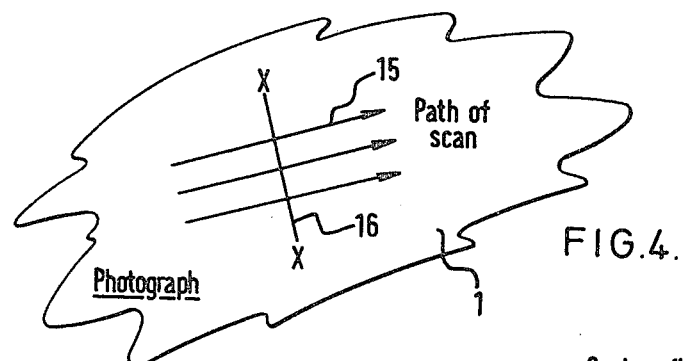
FIG. 4 and FIG. 5 are diagrams illustrating undistorted scanning of a photographic image.
Figure 5:
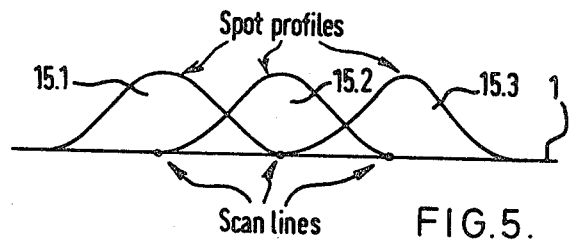

FIGS. 4 and 5 illustrate the requirements of correct sampling.

In FIG. 4, parts of successive scan lines 15 are shown on the plane 1. The line 16 is shown perpendicular to the direction of line scan in the plane 1.

FIG. 5 represents a section on the line 16 of FIG. 4 showing the flying spot profiles 15.1, 15.2 and 15.3 of three successive lines of the raster scan 15. The scanning spot configuration in plane 1, profile in FIG. 5, is chosen so that the maximum information from the image in plane 1 is extracted by the scan 15. Too narrow a spot profile give rise to aliasing in the frequency spectrum of the sampled image. Too wide a spot profile results in unnecessary video frequency reduction, that is image blurring.

Figure 6:
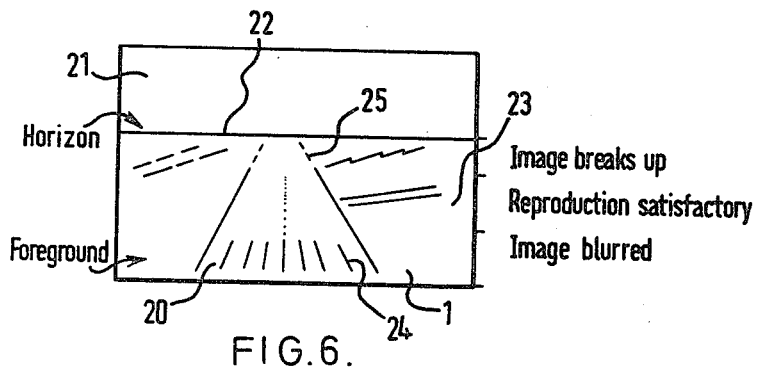
FIG. 6 is a diagrammatic display showing defects in a flying-spot scanned image.

FIG. 6 represents a display resulting from perspective transformation by a system similar to that of FIG. 3, where the display comprises the perspective transformed image of a runway 20 in the plane 1, extending from the observer towards an horizon 22 separating the plane 1 from a sky area 21.

To provide the image of FIG. 6, the photographic image scan raster is distorted to be wide at the horizon 22 and narrow in the foreground 24. In consequence, the reproduction in the displayed image is satisfactory only in the middle ground 23. The foreground 24 becomes blurred and in the background 25, the image breaks up.

Development of such a system with a variable image scanning spot size would present considerable electronic and optical problems. No such system has in fact been developed.

The principle of perspective transformation applies equally to an electronically-stored image as to a photographically-stored image.

Figure 7:
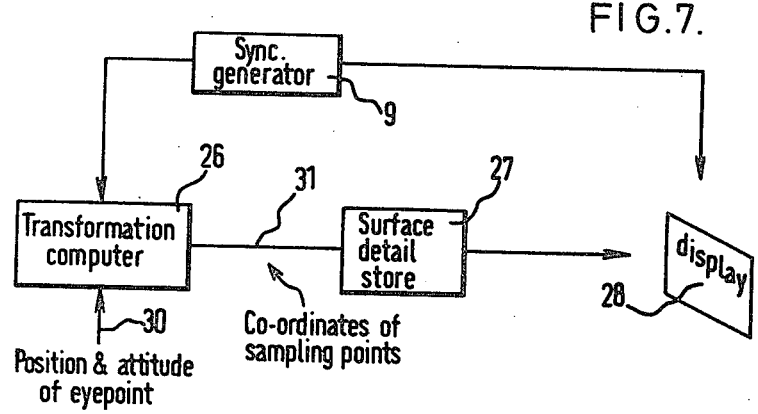
FIG. 7 is a block schematic diagram referred to in a description of raster shaping with an electronically-stored image.

FIG. 7 is a diagram showing the basic elements of a known wholly electronic system. In FIG. 7, a synchronising pulse generator 9 controls both a perspective transformation computer 26 and the display means 28. A surface detail store 27 is sampled under control of the transformation computer 26. Position and attitude of eyepoint data are supplied to the transformation computer at 30, so that the co-ordinates of sampling points are defined at 31.

The inverse perspective transformation is computed at 26 to provide an output of sampling point position defined either as two analogue voltages or as two digital numbers. The store 27 is addressed accordingly and a corresponding output signal defining the brightness and colour of the surface image at the defined sampling point is fed to modulate the display scan at 28.

The first such system known was the NASA surface generator developed in 1964 for the space program by the General Electric Company. The output of the transformation computer 26 was two digital numbers representing the sample point computed at a rate of 5 MHz.

In this system, the surface detail store or "map table" was implemented as a purely synthetic logically-defined pattern. By using only the lower order bits of the sampling vectors, it was possible to create a repetitive pattern covering an entire surface, the so-called "contact analog".

The map table was structured as a four-level hierarchy, with each level defined as an $8 \times 8$ matrix providing a one-bit output designating one of two possible colours.

Complex networks of patterns were obtained by logically combining the outputs of the map levels, each of which contributed to the textural design over repetitive regions of defined size. These regions are structured so that patterns corresponding to the several levels are nested within one another.

Figure 8:
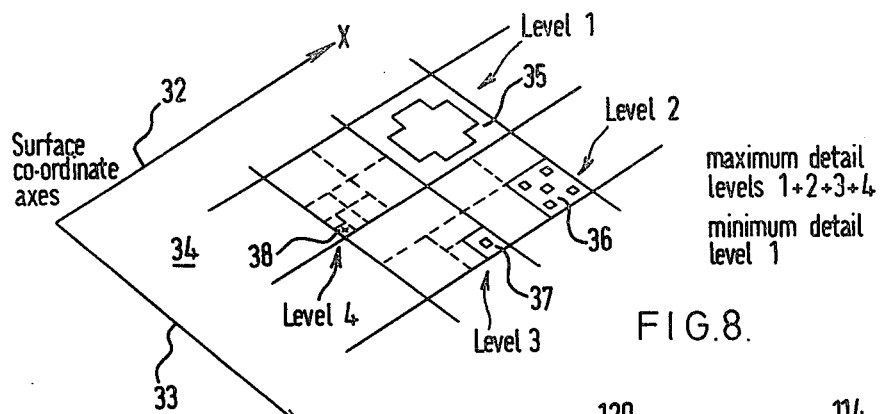
FIG. 8 is a diagram defining levels of surface detail.

FIG. 8 shows the principle applied. In FIG. 8, the axes 32, 33 define the X axis and Y axis of the map plane 34. Areas 35, 36, 37 and 38 respectively show map areas corresponding to level 1, level 2, level 3 and level 4, each level defining an area one-quarter the area of the previous level.

Such a hierarchy of pattern levels made possible transitions from one level of detail to another by deleting the contribution from the map whose cells approached the raster cell structure. The display results of this system, while showing numerous sampling defects, was nevertheless a very satisfactory state of art at the time.

More recently, in U.S. Pat. No. 4,263,726 (Bolton), issued on Apr. 28, 1981, there is described a system for providing simple surface detail for cloud systems overflown. This patent describes visual display apparatus for a ground-based craft flight simulator including a flight computer, comprising raster scan type display means for viewing by a trainee pilot observer synthetic image generating means for supplying to the display means a signal representing an image of sky, horizon and a simulated patterned surface extending to the horizon, said patterned surface being displayed in true perspective in accordance with the simulated altitude and position in space of the craft simulated and a general purpose programmable computer connected to interface the said flight computer and the said synthetic image generating means, said synthetic image generating means comprising a digital store for holding a single pattern cycle of a repetitive pattern for patterning the said patterned surface in one dimension thereof, a perspective computer for computing the track of a ray from the observer's eye, through the scanning spot of the display means, in its instantaneous position, and to a point of intersection on said simulated patterned surface, a computing element for providing a signal output for the display means representative of a variable brightness portion of sky and switch means for selectively supplying to the display means either the signal representative of the patterned surface or the signal representative of the variable brightness portion of sky, continuously during the raster scan of the display means.

No proposals have been published for the application of the shaped image-scanning raster technique to digitally-stored half-tone images, such as would be required for realistically textured terrain or target displays.

DESCRIPTION OF THE EXAMPLE

A specific embodiment of the invention will now be described firstly with reference to FIG. 9, which is a block schematic diagram showing a complete surface texture generator for ground plane display. The block schematic elements of FIG. 9 are then described and explained in greater detail with reference to FIGS. 10-41.

Figure 9:
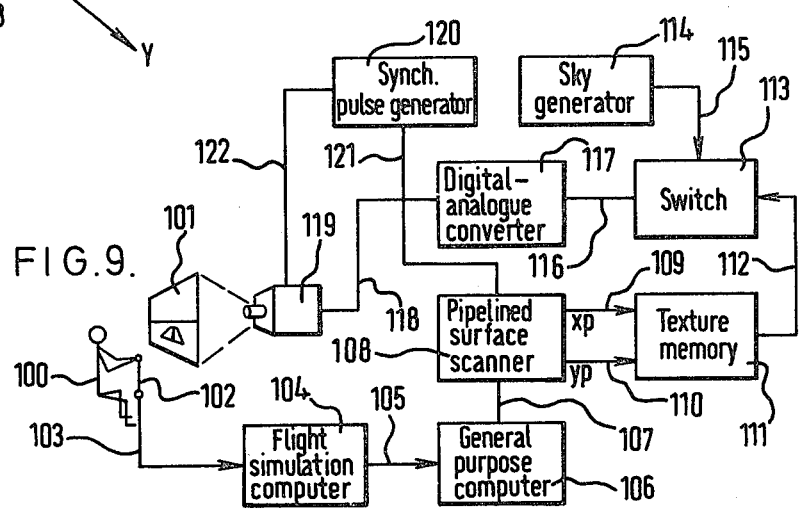
FIG. 9 is a block schematic diagram of the visual display system of the present invention.

In FIG. 9, a trainee pilot 100, seated in the dummy cockpit of a ground-based flight simulator, has a visual display provided before him on a back-projection screen 101 and has dummy flight controls represented by a control column 102. Control setting data is fed by line 103 to a flight simulation computer 104 in the usual manner. Aircraft position and attitude data is supplied twenty times per second from the flight simulation computer 104, by way of line 105 to a general purpose computer 106.

The visual display image on the screen 101 is produced by a television type projector 119 fed with a video signal on line 118. The raster scan of the projected image is controlled by a synchronising pulse generator 120 which provides line and frame synchronising pulses to the projector 119 on line 122.

Set-up data is sent from the general purpose computer 106 to the surface scanner 108 by way of line 107 once for each display field.

The surface scanner 108 is a pipelined scanner more particularly described with reference to FIG. 19.

The values of $x_p$ and $y_p$, defined according to equations (1) and (2) later herein are supplied for each display field from the surface scanner 108 to the texture memory 111 by way of lines 109 and 110, respectively, and synchronising pulses are supplied to the surface scanner 108 from the pulse generator 120 by way of line 121.

The texture memory 111 is arranged in the manner described with reference to FIG. 38, later herein, and the texture detail accessed by the input co-ordinates is supplied as a digital number by way of line 112 to a switch 113.

It will be appreciated that the ground plane surface texture information, with which the present invention is particularly concerned, relates to that part of the displayed image which lies below the simulated horizon. In the display exemplified upon the screen 101 in FIG. 9, there is shown a runway on the ground plane and sky above the horizon. For completeness of the visual display system of FIG. 9, there is included a sky generator 114 which provides an alternative digital input to switch 113 by way of line 115. The switch 113 selects either ground plane or sky information, from line 112 or line 115 respectively, during each line scan at the ground/sky transition defined by the horizon. This transition is effected in known manner as is described in Patent Application No. 7913058, referred to earlier.

The selected output from switch 113 is supplied by line 116 to a digital-analogue converter 117 and the analogue video signal is supplied by line 118 to the projector 119, as already stated.

In order to provide a surface detail generator according to FIG. 9 in hardware, the two main sub-systems need to be designed. The first is the perspective transformation computer, or surface detail scanner, 108 and the second is the surface detail store, or texture memory, 111.

An explanation and description of the surface scanner 108 will be given first.

Before doing so, however, it is necessary to define the objectives of perspective transformation and the co-ordinates and the mathematical terms used in the description.

Figure 10:
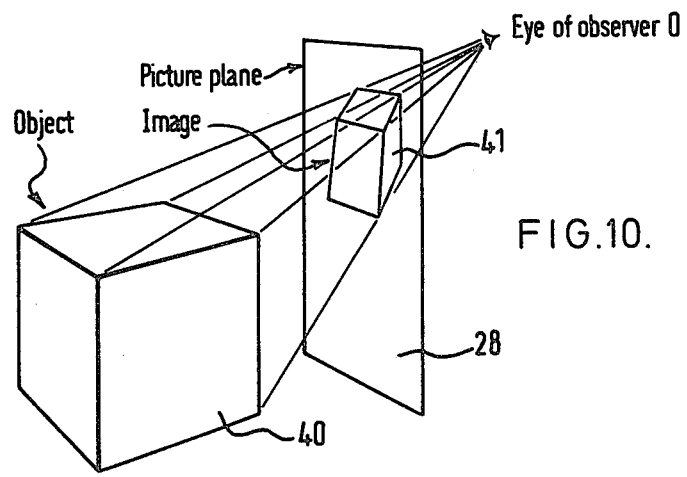
FIG. 10 is a perspective diagram illustrating the principle of linear perspective.

FIG. 10 is a perspective diagram showing a solid realworld object 40 viewed directly by an observer 0. An image 41 is displayed in the intermediate display plane 28 which is the visual equivalent of the object 40, that is the eye of the observer 0 cannot in any way distinguish the image 41 from the object 40. As shown, the image 41 is subject to a perspective transformation with respect to the object 40.

Figure 11:
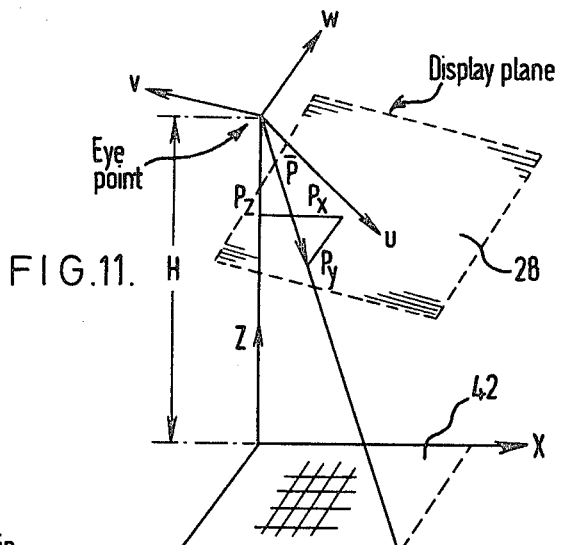
FIG. 11 is an isometric diagram showing the geometry of perspective transformation.

FIG. 11 is a three-dimensional diagram showing the geometry of such perspective transformation from an object plane 42 onto the display plane 28.

Figure 12:
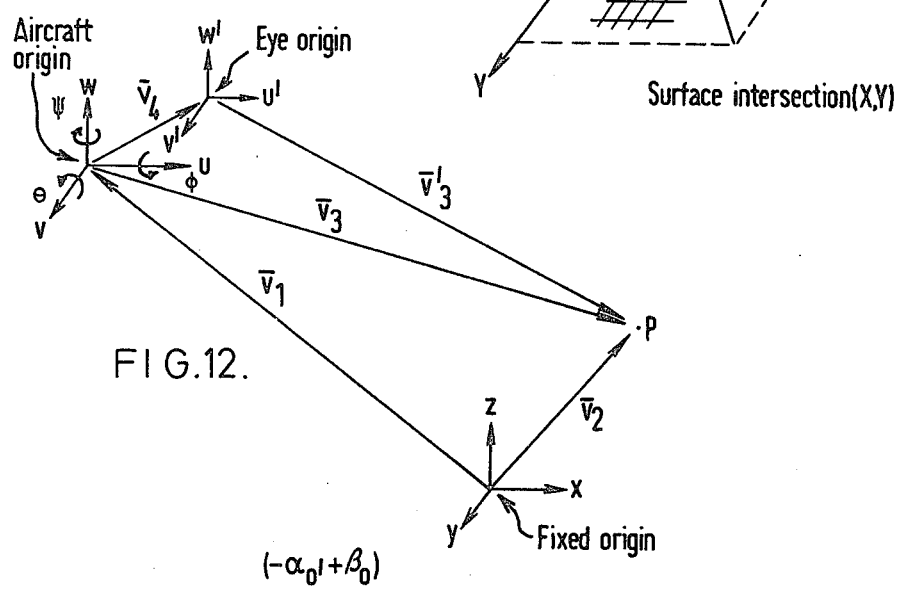
FIG. 12 is a diagram defining the three sets of three-dimensional co-ordinates used.

FIG. 12 is a three-dimensional diagram showing the relationship of three sets of three-dimensional co-ordinates relating respectively to a fixed real-world origin, the simulated aircraft origin and the observer's eye origin. A point P on a display plane is defined in position relatively to the three sets of co-ordinates.

Figure 13:
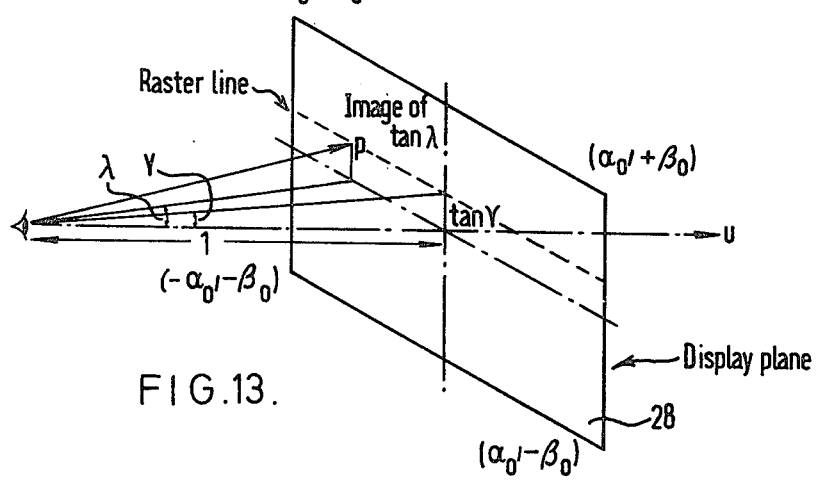
FIG. 13 is a diagram defining the location of image points on the display plane raster.

FIG. 13 defines the location of that point P on the raster in the display plane 28.

The function of the surface scanner is to provide continuous real-time solutions to the two equations:

$$x_p = X_o - H \frac{(\cos\theta + \sin\theta\{\sin\phi\tan\lambda - \cos\phi\tan\gamma\})\cos\psi - \{\cos\phi\tan\lambda + \sin\phi\tan\gamma\}\sin\psi}{\sin\theta + \{\cos\phi\tan\gamma - \sin\phi\tan\lambda\}\cos\theta} \quad (1)$$

-continued
$$y_p = Y_o - H \frac{(\cos\theta + \sin\theta\{\sin\phi\tan\lambda - \cos\phi\tan\gamma\})\sin\psi + \{\cos\phi\tan\lambda + \sin\phi\tan\gamma\}\cos\psi}{\sin\theta + \{\cos\phi\tan\gamma - \sin\phi\tan\lambda\}\cos\theta} \quad (2)$$

These equations relate the position of the surface sampling point ($x_p$, $y_p$) to the viewer's attitude defined by $\Psi$, $\theta$ and $\phi$, his displacement from the surface origin ($X_o$, $Y_o$, H) and the position of the display scanning spot, defined by tan $\lambda$ and tan $\gamma$. As can be seen from FIG. 13, tan $\lambda$ and tan $\gamma$ are the actual rectangular co-ordinates of the scanning spot on the display plane 28, and thus vary linearly when a rectangular scan is used. The scanner must compute a value for $x_p$ and $y_p$ for every value of tan $\lambda$ and tan $\gamma$ between the limits of the display in the display plane 28, in synchronism with the scan of the display device.

The structure and properties of the perspective transformation itself, as represented by Equations (1) and (2), will be examined.

The two transformation equations (1) and (2) must be computed for every value of tan $\lambda$ and tan $\gamma$, that is for every picture element of every display frame.

For a 625 line 50 Hz system with square picture elements, tan $\lambda$ changes at a rate of 15 MHz and tan $\gamma$ at a rate of 15.625 kHz.

The television type display standard selected determines the required perspective transformation computation rate. The form of the computation required is given by the two equations following:

$$x_p = X_o - H\left\{\frac{a_x + b_x \tan\lambda}{c + d\tan\lambda}\right\} = \quad (3)$$

$$X_o - H\left\{\frac{A_x(\lambda,\gamma)}{B(\lambda,\gamma)}\right\}$$

$$y_p = Y_o - H\left\{\frac{a_y + b_y \tan\lambda}{c + d\tan\lambda}\right\} = \quad (4)$$

$$Y_o - H\left\{\frac{A_y(\lambda,\gamma)}{B(\lambda,\gamma)}\right\}$$

Figure 14:
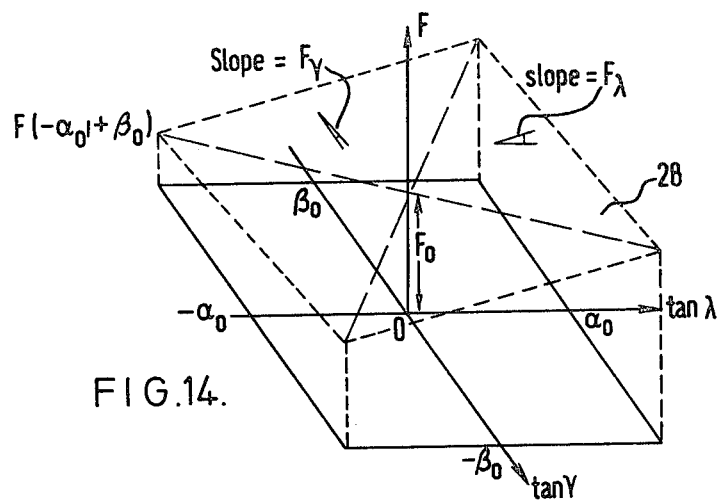
FIG. 14 is a diagram showing the orientation of a defined plane with respect to rectangular axes.

Considering first those parts which change at picture element rate, that is those parts which are functions of tan $\lambda$, it is seen that tan $\lambda$ is proportional to the horizontal distance of an element from the centre of a raster line. It is in fact equal to this distance on the unit display, as shown in FIG. 13. Thus, both the numerators and denominators of equations (3) and (4) are linear functions of this distance, which itself is known at equal steps along a line. The values of $a_x$, $a_y$ and c are likewise linear functions of tan $\gamma$, which is proportional to the vertical distance of a line from the screen centre. A two-dimensional representation of one of these functions in equation (3) or (4) F, is given in FIG. 14, in which the slope of the plane is given in the tan $\lambda$ direction by $F_\lambda$ and in the tan $\gamma$ direction by $F_\gamma$. This is consistent with the geometrical interpretation of FIG. 11, where the three linear functions of equations (3) and (4) represent the distance of the scanning spot from the eye point in the three ground axes X, Y and Z. Referring to FIG. 14, the (tan $\lambda$, tan $\gamma$) plane can be identified with the display plane 28 and the values of F with one of the three distances.

In general, the values of $F_0$, $F_\lambda$ and $F_\gamma$ change for each display frame, thus defining a new two-dimensional linear function. These functions may be computed in an incremental manner, thus:

$$A_x(\lambda,\gamma) = A_x(-\alpha_o,\beta_o) + mA_{x\lambda}\Delta\tan\lambda + nA_{x\gamma}\Delta\tan\gamma \quad (5)$$

$$A_y(\lambda,\gamma) = A_y(-\alpha_o,\beta_o) + mA_{y\lambda}\Delta\tan\lambda + nA_{y\gamma}\Delta\tan\gamma \quad (6)$$

$$B(\lambda,\gamma) = B(-\alpha_o,\beta_o) + mB_\lambda\Delta\tan\lambda + nB_\gamma\Delta\tan\gamma \quad (7)$$

where

| | | |
|---|---|---|
| $A_x(\lambda,\gamma)$ | = | numerator of Eqn. (3) (or Eqn. 1) |
| $A_y(\lambda,\gamma)$ | = | numerator of Eqn. (4) (or Eqn. 2) |
| B $(\lambda,\gamma)$ | = | denominator of these equations |
| m | = | picture element number (m=1,2,3, ...) |
| n | = | line number (n=1,2,3, ...) |
| $\Delta\tan\lambda$ | = | elemental increment of tan$\lambda$ |
| $\Delta\tan\gamma$ | = | line increment of tan$\gamma$ |
| $A_x\lambda$<br>$A_y\lambda$<br>$B\lambda$ | ) | $A_x$, $A_y$, B slopes in $\lambda$ direction |
| $A_x\gamma$<br>$A_y\gamma$<br>$B\gamma$ | ) | $A_x$, $A_y$, B slopes in $\gamma$ direction |

$$x_p = X_o - H\left(\frac{A_x(\lambda,\gamma)}{B(\lambda,\gamma)}\right) \quad (3)$$

$$y_p = Y_o - H\left(\frac{A_y(\lambda,\gamma)}{B(\lambda,\gamma)}\right) \quad (4)$$

In the most direct implementation the desired results $x_p$ and $y_p$ may be computed by performing the divisions $A_x/B$ and $A_y/B$, the multiplications by H and the subtractions from $X_o$ and $Y_o$ all at picture element rate.

In order to achieve the required computation rate, a form of parallel computing is used. In an efficient parallel processor, that is, one in which the arithmetic elements are never idle, the time needed to compute Eqn. (3) or Eqn. (4) is easily found. The input parameters to this calculation are the performance characteristics of the circuit technology used and of the arithmetic algorithms chosen.

The types of arithmetic algorithms which may be considered are limited by the form of system architecture—the pipeline—which is chosen.

In conventional computation, a first set of data is inputted and propagates through the logic until the answer is provided. At any instant, only a small part of the logic is in use. Consequently, the system capacity is low and the system has low efficiency.

When the total computation can be divided into a large number of sub-computations, a pipelined processor may be used. Each sub-computation occupies a separate stage of the processor, in sequence, with a memory between each stage. The first data input propagates through all the sequential stages but, as each stage is vacated, new data may follow, so that every stage is occupied simultaneously, performing its own sub-computation and storing its own answer in its own memory. Although the throughput delay is the sum of the sub-computation periods, the computation rate is set by the sub-computation period, because a new final answer becomes available after each period.

The system has been described in the technical literature, for example T. G. Hallen and M. J. Flynn, "Pipelining of arithmetic functions", IEEE Trans. Comput. vol. C-21, pp. 880–886, Aug. 1972, and J. Deverell "Pipeline Iterative Arithmetic Arrays", IEEE Trans. Comput. pp. 317–322, March 1975.

The pipeline form of parallel processing has here been chosen mainly for its ease of implementation and flexibility. No complex control logic is necessary and the structure of the computation is "built in". The surface memory sub-system is also conveniently organised as a pipeline, so that a completely homogeneous system has been constructed.

Figure 15:
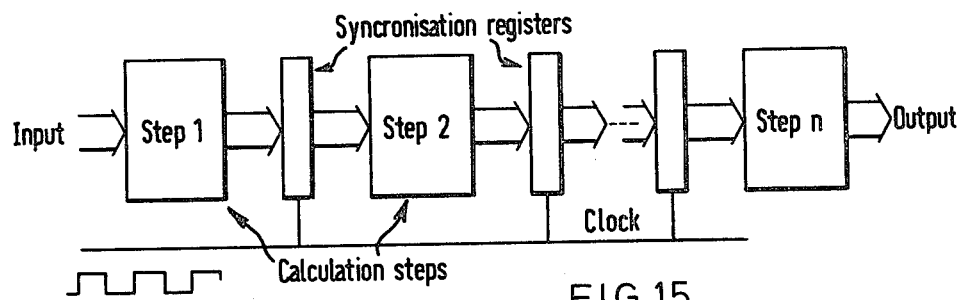
FIG. 15 is a logic diagram showing the sequence of calculation steps in a pipeline processor.
Figure 16:
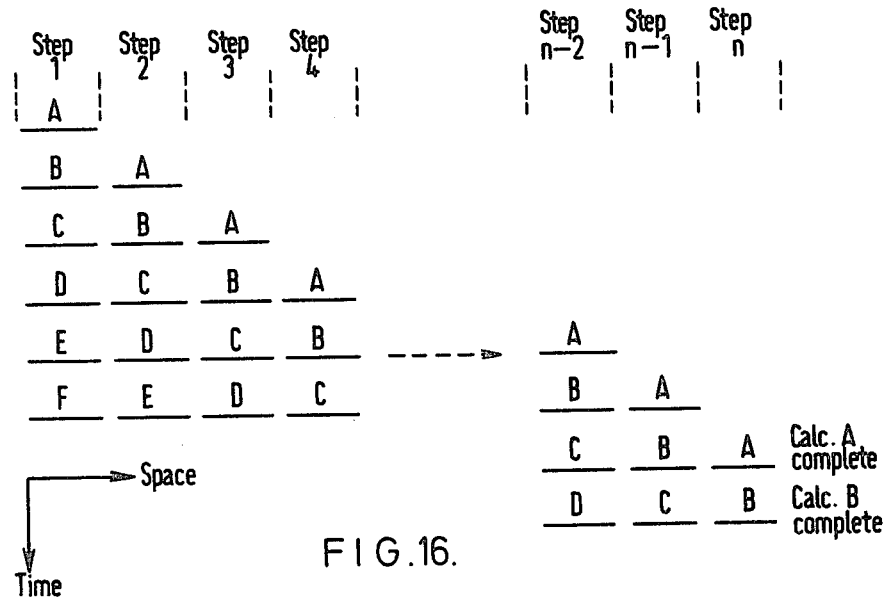
FIG. 16 is a diagram explaining the progress of sequential calculations through a pipeline.
Figure 17:
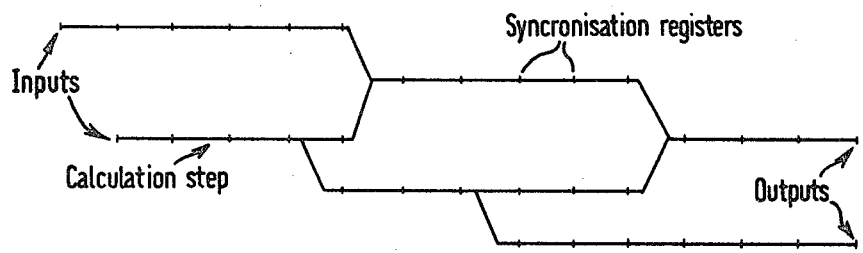
FIG. 17 is a logic diagram showing a parallel pipeline configuration.

Pipelining is effective in a system where the minimum system computation rate is a constraint, as it is in the present surface scanner. A calculation is pipelined by splitting it into steps, each of which is performed by a logic network in one time period, ($66\frac{2}{3}$ ns for a 15 MHz clock frequency). At the end of each calculation step, the result is resynchronised with the clock in a synchronisation register. FIG. 15 shows the form of a pipelined system, while FIG. 16 illustrates the progress of an n-step calculation through such a pipeline. It is to be noted that the time for one complete calculation is n clock cycles, and that new results emerge every cycle. It is of interest that pipelines may be operated in parallel and may be split and merged, as shown in FIG. 17, to fit the particular calculation.

Figure 18:
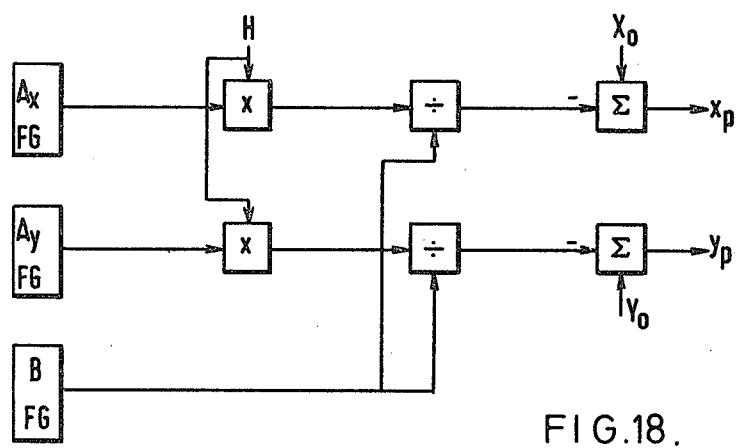
FIG. 18 is a timing sequence and timing interface diagram for a parallel pipeline.

The solution of Equations (3) and (4) can be organised in different ways. FIG. 18 shows the most obvious way, while FIGS. 19 and 20 show more economical methods. The choice between the method of FIG. 19 or FIG. 20 depends on the relative costs of the pipelined multipliers and dividers, which again depends on the number of bits required. Scaling and accuracy considerations define this. The function generator resolutions can be determined by examining their effect on the displayed horizon, whose location is given as the locus of points where $B=0$. The smallest resolvable roll angle is approximately $\tan^{-1}(1/800)$, given by the size of the picture element grid. With pitch set to zero, $$B(\lambda, \gamma) = \cos \phi \tan \gamma - \sin \phi \tan \lambda \qquad (8)$$

For the incremental generation of this function (according to Equation (7)) the magnitudes of $B\lambda$ and $B\gamma$ are approximately $\tan^{-1}(1/800) \Delta \tan \gamma$ (or $\tan^{-1}(1/800) \Delta \tan \gamma$, since $\Delta \tan \lambda = \Delta \tan \gamma$) which is between $2^{-19}$ and $2^{-20}$. As the maximum absolute value of B is 1.16, 22 bits are required for the B function generation. The same type of argument is applied for the pitch and heading angles by use of the B and $A_x$ or $A_y$ functions respectively. In practice, 22 bits are found to be sufficient in all cases. However, 24 bits are used for the function generators, since arithmetic circuit blocks generally come in four-bit units. With the 20 bits used for the representation of $x_p$ and $y_p$, all arithmetic units were designed for 24 bit wide inputs, four bits being unused at the outputs to allow for rounding errors.

Figure 19:
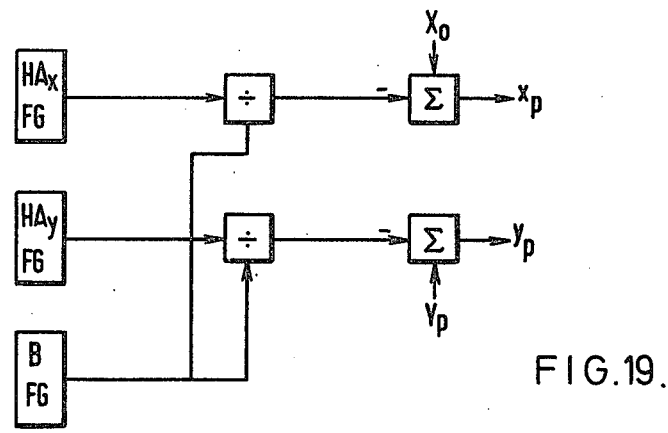
FIG. 19 and FIG. 20 show alternative methods to that of FIG. 18, the method of FIG. 19 being preferred herein.
Figure 20:
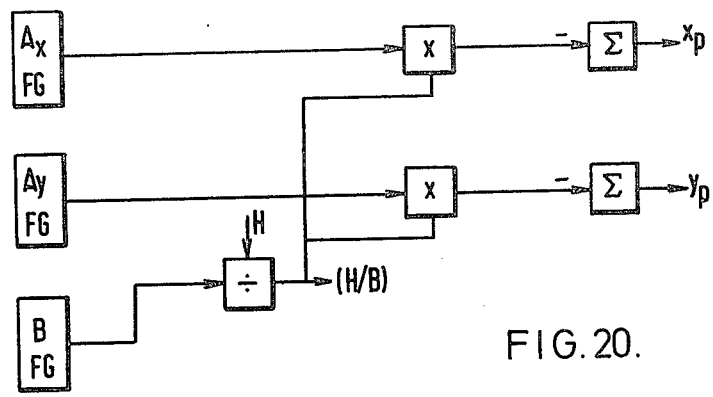

The choice between the arrangments of FIGS. 18 and 19 can now be made. The arrangment of FIG. 19 has been chosen, as two fewer circuit cards are needed.

The arithmetic units include:

(a) a 24 bit two-dimensional linear function generator,
(b) a 24 bit pipelined multiplier, and
(c) a 24 bit pipelined divider.

The purpose of a function generator is to produce values of the function F, according to the formula:

$$F(\lambda, \gamma) = F(-\alpha_o, \beta_o) + mF_\lambda \Delta \tan \gamma + nF_\gamma \Delta \tan \gamma \qquad (9)$$

Figure 21:
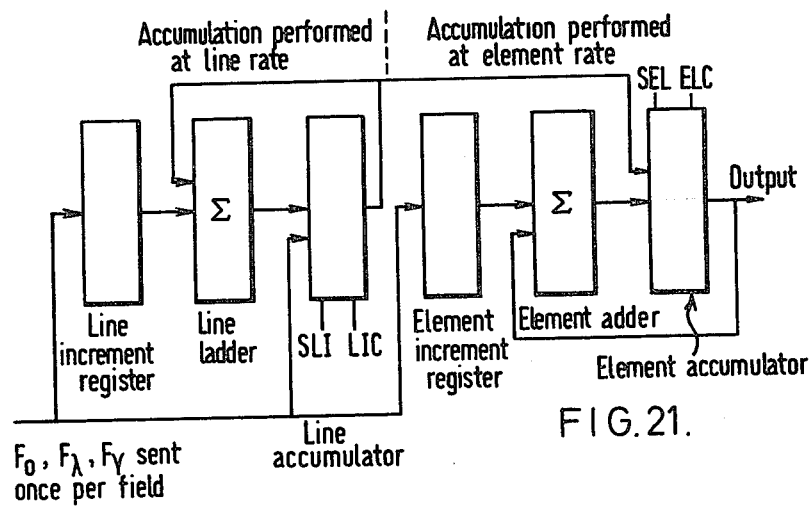
FIG. 21 is a block diagram of a two-dimensional linear function generator.

FIG. 21 shows in block diagram form how such a function can be computed. This process is further described in U.S. Pat. No. 4,263,726 referred to earlier herein.

Figure 22:
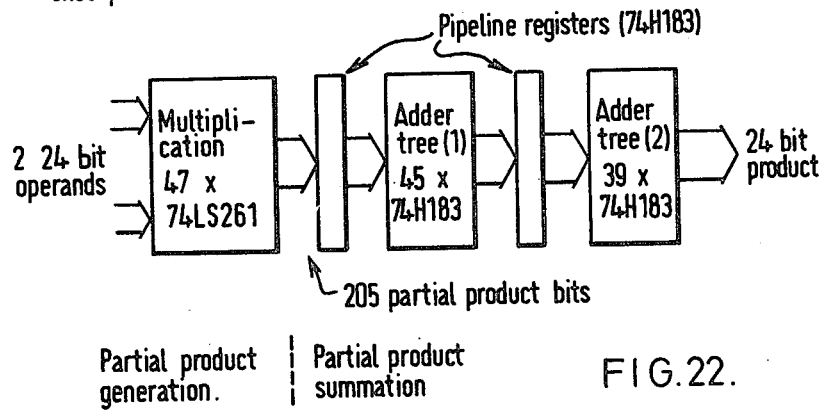
FIG. 22 is a block diagram of a pipelined multiplier.

The pipelined multiplier, shown in FIG. 22, is based on the Texas Instruments 74LS261. This device, which operates on a modified form of Booth's algorithm in which multiplier bits are examined three at a time, is used in the recommended configuration.

No special logic is needed to handle negative operands and the whole multiplier produces a correct two's complement result. The partial product bits generated are combined in an adder tree using 74H183 carry-save adders. Two sets of pipeline registers are required, one after the mutliplication and one in the adder tree.

Figure 23:
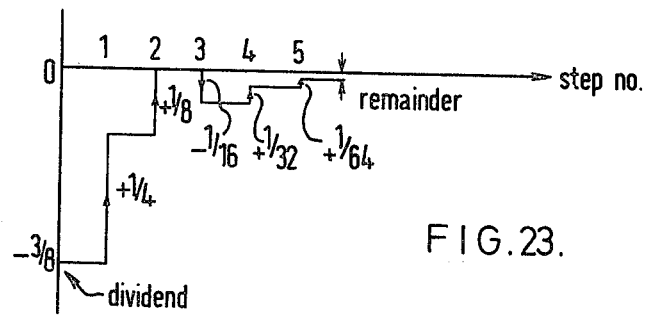
FIG. 23 is a diagram illustrating the process of two's complement non-restoring division.

Division is performed by the non-restoring algorithm. FIG. 23 shows a graph for the example: $(-\frac{3}{8} \div \frac{1}{2})$ calculated by this method. The non-restoring method adds or subtracts powers of the divisor so as to reduce the absolute magnitude of the partial dividend and for a proper division the remainder has a magnitude less than that of the divisor, and may have the opposite sign. In this case, the quotient should be further corrected, but as this adds an error only in the least significant place it is ignored.

Figure 24:
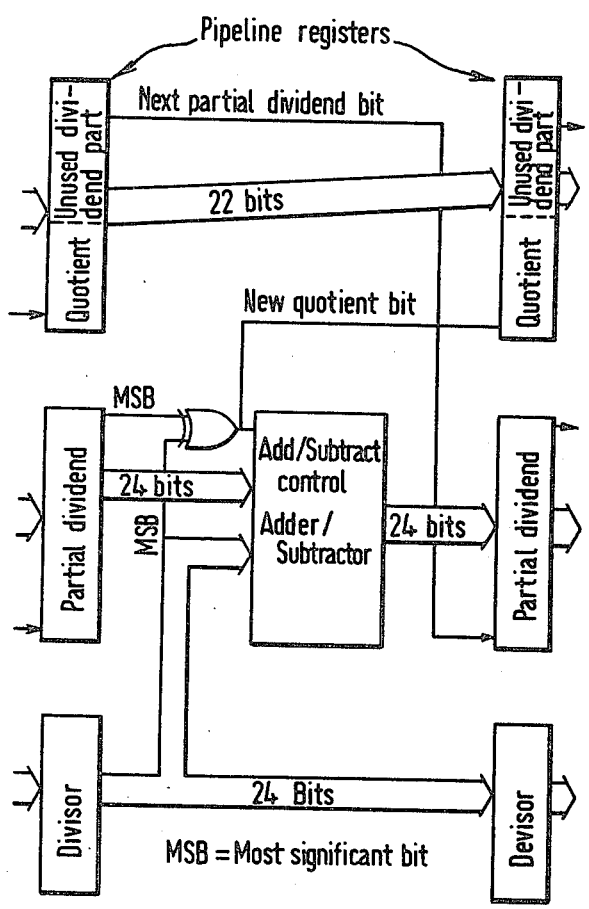
FIG. 24 is a diagram showing one stage of a divider pipeline using the process of FIG. 23.

The algorithm is easily implemented as a pipeline; one stage is shown in FIG. 24. Each calculation is performed by an adder/subtractor controlled by the exclusive $-OR$ of the most significant bits of the partial dividend and divisor. After each addition/subtraction the shift takes place through the discarding of the partial dividend most signifcant bit and the substitution of a new partial dividend bit in the least significant position. After each stage in the division the quotient/unused dividend register contains one more quotient bit and one less unused dividend bit until at the end it contains only quotient bits. The final stage of the division is the quotient correction which converts the $+1, -1$ coded number into two's complement.

All adder/subtractors in the divider are Texas Instruments 74S181 arithmetic/logic units with Intel 3003 look-ahead carry units.

Figure 25:
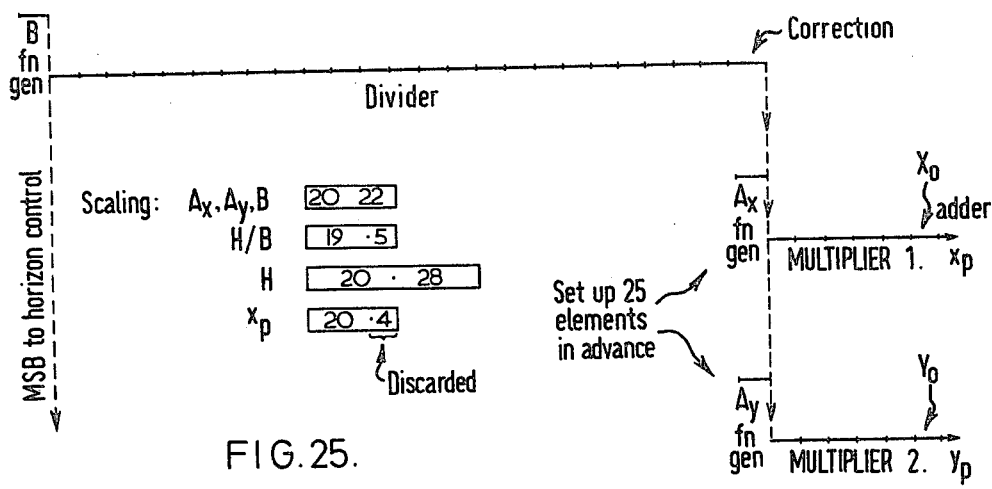
FIG. 25 is a diagram explaining the arithmetic pipeline using the configuration of FIG. 17.

The pipeline diagram for the whole transformation calculation can now be drawn following the scheme of FIG. 17, this is given in FIG. 25. It is to be noted that the $A_x$ and $A_y$ function generators are fed modified initial conditions, $A_x (-\alpha_o, \beta_o)$ and $A_y (-\alpha_o, \beta_o)$, because of their position in the pipeline. FIG. 25 also shows the scaling of all operands.

The three function generators, each with three inputs, are interfaced to a general purpose computer by its I/O bus. Transfers of data between the computer and the function generators occur whenever an output instruction containing one of the nine function generator addresses is executed. These transfers occur during display blanking periods. The computer program must therefore having some means of determining when these periods occur. This is achieved by use of the computer input/output flag system. A flag consists of a flip-flop which can be set by an external signal. The state of this flip-flop can be sensed by the computer (using input and conditional branch instructions) and it can be reset (using an output instruction).

Two flags are used for synchronisation of the program with the display raster, the odd-field flag and the even-field flag. The odd-field flag is set at the start of the odd-field blanking period and the even-field flag is set at the start of the even-field blanking period. The computer must be idle at the end of an odd or even field and thus able to continuously test the two flags. When one of these flags has been set, the program updates the function generators with data computed during the previous field, and clears the flag. Computations of the set-up data for the next field may now proceed using the latest available input data. This computation must end before the end of the current field.

Figure 26:
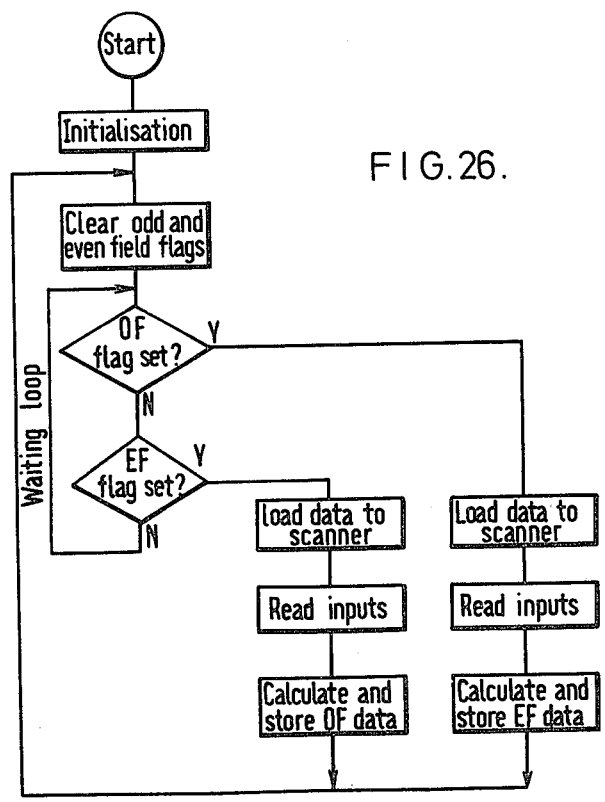
FIG. 26 is a flowchart of the general purpose computer scanner control program.

The flowchart of FIG. 26 shows how the program is organised. It is to be noted that, during the even field, the odd field set up conditions are calculated and vice-versa. New data defining the eye point attitude and position is read every field.

The second sub-system of the surface detail generator of FIG. 9, that is the surface texture memory 111, will now be described.

The surface memory accepts as input the vector ($x_p$, $y_p$) at a rate of 15 MHz representing the position of the surface intersection, and delivers as output a video signal which may be sent directly to the display device, after digital/analogue conversion. The design problem is totally that of aliasing control.

Figure 27:
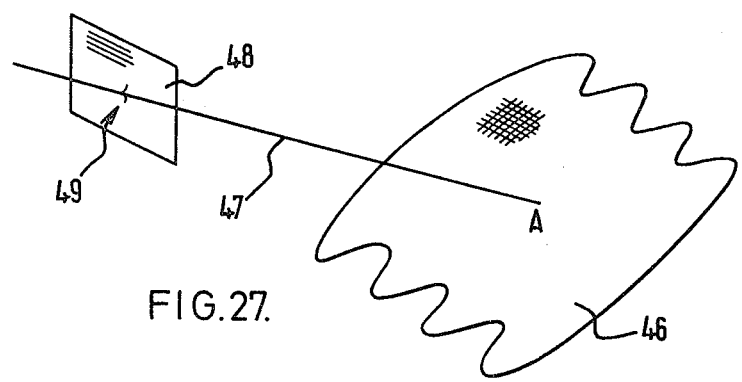
FIG. 27 is perspective diagram illustrating the production of a television camera image of a plane surface.
Figure 28:
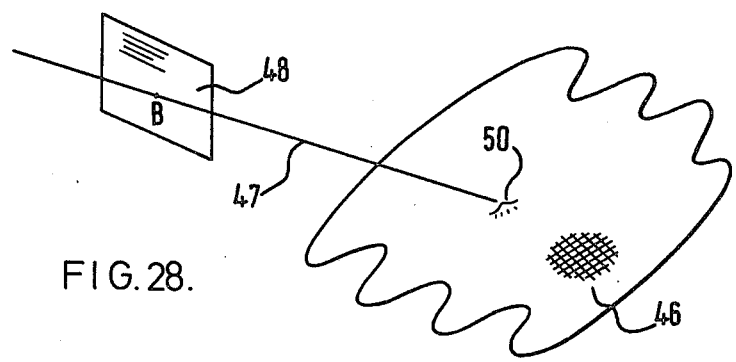
FIG. 28 is a diagram illustrating the corresponding process using an imaginary mapped aperture.

FIG. 27 and FIG. 28 are two perspective diagrams representing the process of viewing a textured plane surface in perspective. FIG. 27 represents viewing by a television camera. FIG. 27 shows a textured plane 46 viewed by a camera along the axis 47. The camera image plane is shown at 48. FIG. 28 shows the textured plane 46 viewed along the line 47 and the plane 48 represents the display plane.

Considering the television camera image production process of FIG. 27, on any position of the television raster scan, a ray may be drawn from the centre of projection (the imagined eyepoint) to the surface 46, where it intersects at point A. The action of the camera optical system and scanning beam may be combined by imagining an "aperture" with a distribution similar to that of FIG. 27. The effect of the aperture is to integrate information from surrounding parts of the brightness distribution on the image plane into a single value which is the video signal for that point of the raster scan. In a well-adjusted camera, the extent of this aperture will be such that the maximum possible amount of information will be extracted from the scene. In other words, the pre-sampling filter is correct. Too small an aperture produces aliasing, whereas too large an aperture causes unnecessary blurring. The image, therefore, corresponding to point A is made up from the brightnesses of a region of the surface in the neighbourhood of A. The further A is from the image plane the greater the size of this neighbourhood will be and the less detailed the image.

FIG. 28 shows an alternative way of viewing this process, one less related to the physical process. Here the aperture is mapped onto the surface 46 itself. The video signal corresponding to point B of the scan is made up of those elements of the surface falling under the mapped aperture. In signal processing terms, a two-dimensional filter is applied to the brightness distribution of the surface. The shape and extent of this filter is a function of the distance and tilt of the surface and is in general asymmetrical.

A direct implementation of this process is impossible, due to the hugh memory access and computing problems that would arise. The parallel access of texture values at a 15 MHz rate and their combination in a variable two-dimensional filter is not considered practical.

The first simplifying assumption is in the use of a two-dimensionally symmetrical mapped aperture. This is subjectively justifiable, as the greatest distortion of the aperture occurs when the displayed detail is the least. With this assumption, off-line and predefined, rather than on-line, filtering is possible. The additional memory required for holding pre-filtered textures requires less board space than a filter required to operate at 15 MHz. Memory architecture can also be considerably simplified, as only one sample has to be read every 66⅔ ns.

The second problem is that of filter selection; the determination in real time of what degree of texture filtering is needed. One possibility is to use the distance from the eyepoint to the surface. This distance is given by:

$$d = \frac{H\sqrt{1 + \tan^2\lambda + \tan^2\gamma}}{\sin\theta + \cos\theta\{\cos\phi\tan\gamma - \sin\phi\tan\lambda\}} \quad (10)$$

The value of d may be approximated to:

$$d^1 = \frac{H}{B(\lambda,\gamma)} \quad (11)$$

with a maximum error of about 14% at the corners of the display. This quantity is available "for free" in the arithmetic pipeline of FIG. 20. The use of this value must be rejected however, as no simple relation exists between the mapped aperture dimension and the range.

Since the approach to the filter design is based on aliasing control, the distance between intersections is a useful and easily obtainable measure.

The memory system is based on the hierarchy principle, as previously described, but now the hierarchy levels are real images computed by a variable two-dimensional filter. The system provides a variable number of levels so that the choice of the optimum number can be made subjectively.

The texture memory system design is based on the two following assumptions:

(a) The filter applied to the texture is symmetrical and undistorted, and
(b) The selection of which filtered version of the texture to map is a picture element-by-picture element decision based on the distance between successive samples.

Both of these assumptions introduce approximations, but bring about local geometrical errors only. The main sampling grid is computed exactly and aliasing can be completely controlled. The effect of the first assumption is to apply a greater degree of filtering than would apply in an exact simulation. In this, as has been mentioned previously, the mapped aperture is elongated in the direction of the line of sight for all cases except that of viewing in a direction normal to the surface. The filtering effect is thus greater in the line of sight direction than at right angles. However, since it is assumed that the filter has the same filtering effect in both directions, a greater degree of filtering must be applied across the line of sight in order to avoid aliasing along the line of sight. FIGS. 29 and 30 illustrate this effect. The elongation of the real mapped aperture increases as the line of sight touches the plane at smaller angles, as occurs at points near to those corresponding to the displayed horizon. However, as the total degree of filtering (detail reduction) becomes greater at these points, the effect of this overfiltering becomes less noticeable. The question of aperture elongation and its effects is considered in more detail later herein.

The second assumption above is also related to aperture elongation, for the definition of the "distance between samples" must be decided. As can be seen in FIGS. 29 and 30, the distance between successive samples along a mapped raster line, a, is not the same as the distance between mapped lines, b. A definition of the "distance between samples" is also considered later herein.

Much work has been done recently on the aliasing problem in digital television image synthesis. The known studies are summarised below, as they have an important influence on the design of the texture memory system.

Television image formation can be considered as a three-dimensional sampling process, the three dimensions being the two linear dimensions of the image and time. The sampling aspects of television are well understood and the theory can be profitably applied to television-based computer generated imagery. By studying the operation of a television camera system in terms of sampling theory and then comparing synthetic image generation, the reasons for aliasing in the latter systems can be understood. It is also possible to devise methods for the reduction of aliasing in computed images through this knowledge of television systems.

The classic theory of television image generation derives the spectrum of the television camera output signal by an analysis of the scanning process and the form of sampling used in a television system. The effect of the scanning aperture on aliasing can be considered therefrom. Considering image synthesis in the light of television theory, it is possible to conclude that computed images are analogous to non-band-limited scenes sampled without the use of a pre-sampling filter. Aliasing may be reduced by sampling at a higher frequency and synthesising a pre-sampling filter. Experience has shown that a sampling frequency four times higher in both the vertical and horizontal dimensions produces satisfactory results when using a 625-line projected display in a simulator.

FIG. 31 represents the sampling grid of a discretised display together with some scene details in their exact positions as would be computed by a polygonbased image generator of infinite resolution. Since only one value of brightness and colour can exist over the area of a picture element, some method of mapping the computed image onto the element grid must be employed.

In early image generators the brightness and colour of a picture element was taken to be that of the scene surface visible at the centre of the element, so that for example, in FIG. 31, element (3,3) would be assigned the value $B_1$. This method resulted in edges portrayed with stepped boundaries, and a slight positional change in a computed edge might result in a displayed change in position of one picture element. Distracting effects such as these were accepted in the first image generators, but solutions to these problems have since been found. The method used is to synthesise each displayed picture element from a number of "sub-elements" which in effect, sample the scene on a finer grid. Element (4,10) in FIG. 31 shows the sample points when 16 sub-elements are used. The brightness and colour values computed for each sub-element are combined in a two-dimensional filter to yield the final element to be displayed. The cut-off frequency of this filter must be equal to the maximum spatial frequency which can be represented on the display grid. This is given by sampling theory and is shown by the two sine wave cycles portrayed in FIG. 31.

In simple systems, sub-elements lying within one element are added wih equal weights, (the "area times colour rule"), while in more complex systems, sub-elements lying in adjacent elements may be used as well. All currently manufactured raster-scan computer image generators for simulation now incorporate some form of anti-aliasing.

It is noted that some so-called solutions to the aliasing problem are not in fact cures, but merely treatment of the symptoms. "Edge smoothing" and post-filtering of an image with aliasing errors can only produce acceptable results at the cost of a reduction in the resolution of the displayed image. In other words, elements are treated as sub-elements in a gross filter.

Consider, now, the sampling of an image stored in a memory. For simplicity it will be assumed that the image is defined on a grid identical to that of the display picture element grid. FIG. 32 shows the stored image with the display sampling grid superimposed. There is thus an exact correspondence between stored and displayed images. For a correct representation of the image, before storage, its spactial frequency content must be such that no higher spatial frequencies than those shown in the figure exist. This is achieved by application of the usual pre-sampling filter.

Now assume that the stored image is displaced with respect to the sampling grid, as shown in FIG. 33, as would occur with scene or observer movement. The displacement represented is one-quarter of an element in both vertical and horizontal dimensions. The sampling points all lie within the same boundaries on the memory grid and thus the displayed image is identical to that existing before the displacement. No image change will occur until a displacement of one-half of an element has occurred in either direction. A further change of one element spacing is then required until the next change occurs. A smooth movement of the computed image thus produces abrupt changes in the displayed image.

To match the performance of such a sampled memory system to image generators with anti-aliasing which do not exhibit this element-to-element jumping of scene components, the number of stored image samples must be increased by a factor of 16, the number of sub-elements in each element of the polygon-based system. A smooth movement of the computed image then produces displayed image changes which change four times more often in any linear dimension, thus producing a closer approximation to smooth movement. The stored image must still be prefiltered to the same degree, except that there are now eight rather than two samples per spatial cycle at maximum spatial frequency. FIG. 34 shows the two new grids and the maximum spatial frequency which can be stored. This arrangement is now exactly analogous to the polygon system with anti-aliasing. As far as rotation of the computed image is concerned, the same argument applies. The same approximation to smooth rotation is used as in polygon systems with sub-element sampling.

The design of a texture memory system can now be considered using this data and the two assumptions previously referred to.

At the closest possible eye-surface distance one subelement, as defined above, maps into a surface element of about 2 inches square. For smooth motion, the eye must not be allowed to approach the simulated surface any closer. If the surface is viewed normally at this minimum eye-surface distance, then the situation depicted in FIG. 34 applies.

A memory containing a pattern stored in this manner and filtered to the degree shown could thus constitute the top level of a memory hierarchy, designed to be sampled every four surface elements. This level is called level 0 and is produced from the basic texture pattern by applying a symmetrical two-dimensional filter with cut-off spatial frequencies $\pi/4$ with respect to the fine grid.

Consider the case now where sample points are five surface resolution elements apart. With normal viewing, this corresponds to an eye-surface distance of 5/4 of that producing the four surface element spacing. FIG. 35 shows the dimensions of the memory required for this spacing, where each element has 5/4 the linear dimension of a surface resolution element. The new memory grid, the top right-hand one in FIG. 35, maps onto the display exactly as the level 0 grid shown in FIG. 34. The degree of prefiltering required for this level to prevent aliasing requires a low-pass filter with cut-off frequencies $\pi/4$ with respect to the larger mapped sub-element grid, or $\pi/5$ with respect to the resolution element grid. Ideally, the total amount of storage required for this level of detail would be $4/5 \times 4/5 = 0.64$ of that required for level 0. However, this amount is not achievable in practice.

Level 2, pre-filtered for a sample spacing of 6 resolution elements, would require $4/6 \times 4/6 = 0.44$ of the storage, level 3 $4/7 \times 4/7 = 0.33$, and so on. The final level in the hierarchy will contain only one sample, representing the average brightness of the whole textured area. The next-to-last level, shown in FIG. 36 needs to contain 64 samples and corresponds to the situation where 4 mapped display elements cover the entire pattern. These last levels will exist whatever the initial texture pattern size.

In the implementation a texture pattern size of $64 \times 64 = 4096$ surface resolution elements has been chosen as the largest practical size in a practical system, considering the programmable read-only memories with suitable access times available at the present time.

With this pattern size, the following Table sets out the theoretical and practical memory size for the number of levels needed, 29 levels in this case.

| Level | Sample Spacing | STORAGE QUANTITIES | | |
|---|---|---|---|---|
| | | Theoretical memory size | Practical memory size | Address bits used |
| 0 | 4 | 4096 | $64 \times 64 = 4096$ | $X_5 X_4 X_3 X_2 X_1 X_0 Y_5 Y_4 Y_3 Y_2 Y_1 Y_0$ |
| 1 | 5 | 2621 | 4096 | |
| 2 | 6 | 1820 | 4096 | |
| 3 | 7 | 1337 | 4096 | |
| 4 | 8 | 1024 | $32 \times 32 = 1024$ | $X_4 X_3 X_2 X_1 X_0 Y_4 Y_3 Y_2 Y_1 Y_0$ |
| 5 | 9 | 809 | 1024 | |
| 6 | 10 | 655 | 1024 | |
| 7 | 11 | 542 | 1024 | |
| 8 | 12 | 455 | 1024 | |
| 9 | 13 | 388 | 1024 | |
| 10 | 14 | 334 | 1024 | |
| 11 | 15 | 291 | 1024 | |
| 12 | 16 | 256 | $16 \times 16 = 256$ | $X_3 X_2 X_1 X_0 Y_3 Y_2 Y_1 Y_0$ |
| 13 | 17 | 227 | 256 | |
| 14 | 18 | 202 | 256 | |
| 15 | 19 | 182 | 256 | |
| 16 | 20 | 164 | 256 | |
| 17 | 21 | 149 | 256 | |
| 18 | 22 | 135 | 256 | |
| 19 | 23 | 124 | 256 | |
| 20 | 24 | 114 | 256 | |
| 21 | 25 | 105 | 256 | |
| 22 | 26 | 97 | 256 | |
| 23 | 27 | 90 | 256 | |
| 24 | 28 | 84 | 256 | |
| 25 | 29 | 78 | 256 | |
| 26 | 30 | 73 | 256 | |
| 27 | 31 | 68 | 256 | |
| 28 | 32 | 64 | 1 | none |
| Total: | | 16,584 | 28,673 | |
| Expansion ratio: | | 4.05 | 7 | |

Memory addressing difficulties prevent the optimum use of memory capacity. The texture memory is addressed by two vectors, $x_p$ and $y_p$, changing at picture element rate, which represent the mapped sub-element positions. FIG. 37 shows how level 0, which contains 4096 samples, would be addressed. ($X_o$ and $Y_o$ are the least significant bits of the X and Y vectors and represent one surface resolution element). Level 1 ideally requires 2621 samples which have to be mapped onto the same address bits used by level 0.

This mapping is feasible using either look-up tables or arithmetic circuitry, and a memory could be constructed to hold the required number of samples.

The practical solution is to simplify the addressing at the expense of storage economy. For level 1, for example, 4096 samples are used and addressed in the same manner as level 0. The above Table shows how the complete hierarchy is stored and the addressing used. The memory expansion factor is 7 for the case of a 4096 sample pattern, as opposed to 4 for the optimum memory use scheme. The simplification in addressing hardware far outweighs the increased memory requirement.

Prefiltered images can be computed by application of a suitable two-dimension low-pass filter.

The final design decision is how the memory hierarchy level selection is to operate. The earlier discussion is based on the assumption that the sample spacing is known. In general, as can be seen in FIG. 29, the sample spacing is different in the x and y directions and the square sampling grid is a special case. To prevent aliasing, the largest distance, b in FIG. 29, is used. In the example given, this distance is that between samples on adjacent lines, but it can equaly well be that between adjacent elements on the same line.

Computation of the distance between samples on the same line is simple and only the previous value of $(x_p, y_p)$ needs to be stored. On the other hand, computation of the distance between samples on adjacent lines requires the storage of one whole line's worth of $(x_p, y_p)$'s. This amounts to approximately $800 \times 24 \times 2$ bits of storage in high speed memory. While this is practical, it would require an extra circuit card. The simpler solution of computing the distance between samples adjacent in time and providing a correction for aperture elongation is considered to be adequate.

This correction factor is applied by use of a level code mapping memory. This memory converts the computed sample spacing into a texture memory level code, which is a number in the range 0 to 28, according to a table loaded from the general purpose computer once per field.

The whole set of texture memories are addressed in parallel using the $x_p$ and $y_p$ bits shown in the foregoing Table. Monolithic Memories 6353-1 integrated circuit programmable read-only memories are used.

FIG. 38 is the block diagram of the complete texture memory system described above, which generates the image of a complete textured ground plane.

As illustrated, the inputs to the texture memory system are the $x_p$ and $y_p$ inputs described above. As stated, the $x_p$ inputs are the solution of equation 1 (equation 3) and the $y_p$ inputs are the solution of equation 2 (equation 4). These inputs are passed through a plurality of registers in an "address" line, shown at the bottom of the figure, to maintain synchronism with the pipeline shown at the top of the figure. The components of the pipeline are clearly indicated in FIG. 28 and, as shown, include parallel summers and sign correction circuits, the output of the latter circuits being fed to a sampling spacing table, code map and decoder to derive a "level select" output, as shown. These components perform the functions described in the preceding paragraphs. Suitable registers are also indicated. The "address" and "level select" outputs are fed to a surface memory as illustrated, in order to fetch the texture signals appropriate to the mapped point. The pipeline determines which stored map or level is to be outputted.

The final, eight-bit wide sequence of digital texture values is fed to a horizon switch identical to that built for the cloud/sky generator. Here a sky signal is combined to form a final image which is sent to the video digital-analogue converter and fed to the display monitor.

A sample spacing correction must be computed and loaded to the level code mapping memory each field to ensure correct operation in all attitudes. It is not practical to compute this exactly, but an acceptable approximation can be made. FIG. 39 shows the mapped raster lines for three angles of roll; it is immediately apparent that the computed sample spacing is only correct when $\phi = 90°$. The error may be simply computed by considering the mapped raster as a continuous function and comparing the rates of change of x and y in the tan $\lambda$ (along lines) and tan $\gamma$ (across lines) directions.

First, note that the mapped raster shape is independent of $X_o$, $Y_o$, H and $\Psi$. If $\Psi$ is made zero, as in FIG. 39, the surface x and y axes are aligned as shown and a suitable correction factor can be defined. This is given by the ratio:

$$\frac{\partial x}{\partial(\tan\gamma)} \bigg/ \frac{\partial y}{\partial(\tan\lambda)} \tag{15}$$

This ratio can be shown to be:

$$\frac{-\cos\phi}{\sin\theta\cos\phi + \tan\gamma\cos\theta} \tag{16}$$

Since the correction factor has to apply to a complete field, the tan $\gamma$ factor is approximated by using a constant value. FIG. 40 shows the effect of this constant correction factor, which replaces the exact, curved level code mapping functions with straight lines. The value of tan $\gamma$ is determined empirically by setting $\theta = \phi = 0$ and adjusting the level code mapping until no aliasing is visible. Use of this value in the general correction factor produces acceptable results for all attitudes.

The Surface Detail Generator described above is suitable for integration into a polygon-based raster scan image generator. Selected surfaces defined as "textured", have their single luminance value modulated by the Surface Detail Generator output.

The system described is capable of transforming texture for a single surface in any one frame. A modification, however, would allow the transformation processor to be re-loaded during a line blanking interval to allow a different plane to be defined. A change in the transformation along a line would also be possible if delaying stages were added to the pipeline so that all inputs referred to the same time instant. The pipeline would of course have to be loaded with the correct number of elements before the surface change was desired due to the computation delay, see FIG. 25.

A problem arises at the boundary of a textured polygon due to the way aliasing is handled at edges in most image generators. To correctly represent the transition, values of the texture luminance have to be known to a resolution finer than one picture element. This is not possible, as the transformation computer can only produce one sample per element. However, since the texture is only modulating an overall luminance value, the filtered edge retains its correct appearance.

Recent advances in high-speed semiconductor memories make possible the construction of a texture generator with a smaller high-speed computing requirement. This may be achieved using the known "rolled raster" principle. FIG. 41 shows such a system in block diagram form.

The texture memory is accessed by vectors $x_p$ and $y_p$ computed according to Equations (1) and (2), that is with $\phi = 0$.

$$X_p = X_o - \frac{H(\cos\theta - \sin\theta \tan\gamma)\cos\psi - \tan\lambda\sin\psi}{\sin\theta + \tan\gamma \cos\theta} \tag{17}$$

-continued $$Y_p = Y_o - \frac{H(\cos\theta - \sin\theta \tan\gamma)\sin\psi + \tan\lambda\cos\psi}{\sin\theta + \tan\gamma \cos\theta} \quad (18)$$

which can be re-written as:

$$X_p = X_o - H\left(\frac{Ex + Fx \tan\lambda}{g}\right) \quad (19)$$

$$Y_p = Y_o - H\left(\frac{Ey + Fy \tan\lambda}{g}\right) \quad (20)$$

Considering those parts which change at picture element rate, that is those parts which are functions of tan $\lambda$, and noting, as previously described, that tan $\lambda$ is proportional to the distance along a scan line from the centre of that scan line, then equations (19) and (20) can be solved at picture element rate with two adders 129 controlled by an address counter 128, FIG. 41.

The multiplications and divisions required may be performed on a line-by-line basis in the general purpose computer 106 supplied with simulated attitude and position information on the input line 105. The output of the texture memory 111 is read into one half, 131 or 132, of the frame store constructed from high speed semiconductor memories. The distance between samples is constant along any line and between lines, as is shown in FIG. 42. Both of these distances are available for any line in the general purpose computer 106 which may then determine which is the greater and select the texture memory level accordingly. No problem of sample spacing correction exists. While one half, 131 or 132, of the frame store is being loaded, the other half, 132 or 131, respectively, is sending its contents to the display along output line 112. Roll is introduced at this point by a simple linear address mapping 130. In other words, the partially transformed texture is read out in lines at an angle of $\phi$ to those on which it was written. The address remap 130 requires two high speed adders for implementation. The whole system thus requires a frame store, a general purpose computer and a small amount of high speed arithmetic circuitry. This represents a considerable saving over the original design if 16K or larger memories are used for the frame store. The disadvantage of this alternative is that only surfaces with the same roll angle with respect to the observer can be transformed in the same frame.

I claim:

1. In a visual display system of the computer generated image type, for a ground-based flight simulator, providing a rectangular raster scanned, perspective-transformed, pilot's visual display of a simulated textured surface, the improvement comprising the provision of a surface detail generator comprising a perspective transformation computer and a surface texture detail store, the perspective transformation computer being a pipelined calculator for computing in real time the perspective transformation from the display system display plane to the simulated surface plane continuously during simulated flight, and correspondingly scanning the surface texture detail store to provide texture for each element of the said rectangular raster scanned pilot's visual display.

2. A visual display system as claimed in claim 1, in which the line and frame constants of the rectangular raster scanned display are first determined, and the pipeline calculator continuously computes the following two equations:

$$x_p = X_o - H\left(\frac{a_x + b_x \tan\lambda}{c + d \tan\lambda}\right) \quad (3)$$

$$y_p = Y_o - H\left(\frac{a_y + b_y \tan\lambda}{c + d \tan\lambda}\right) \quad (4)$$

wherein:

$x_p$, $y_p$ define the simulated surface sampling point;
$X_o$, $Y_o$ define the origins of the simulated surface;
H defines the pilot's eye displacement from the simulated surface;
$\lambda$ defines the horizontal angle of instantaneous displacement of the scanning spot from the pilot's line of view during level flight; and
a, b, c, d are constants.

3. A visual display system as claimed in claim 1 or claim 2, in which the surface texture detail store holds digital information corresponding to the surface texture of said simulated surface, the digital information being filtered correspondingly to a preferred scanning aperture diameter, whereby aliasing of the raster scanned display is avoided.

4. A visual display system as claimed in claim 3, in which the perspective transformation computer is reloaded with input data during line blanking intervals for the purpose of computing the perspective transform for more than a single simulated surface in any frame.

5. A visual display system as claimed in claim 3, in which the pipelined perspective transformation computer includes input means providing for the loading of data corresponding to a change of surface perspective transformation in the course of a line scan and at least one delaying stage to ensure that all inputs refer to a single instant of time of computation.

6. A visual display system as claimed in claim 3, in which the surface texture detail store includes first and second frame stores for storing surface texture information for consecutive frames of the visual display, the said frame stores being loaded alternately, the one outputting its contents while the other is being loaded.

* * * * *